(12) United States Patent
Yamamura

(10) Patent No.: US 7,859,757 B2
(45) Date of Patent: Dec. 28, 2010

(54) LENS-ARRAY, EXPOSURE DEVICE, IMAGE FORMING APPARATUS AND READING APPARATUS

(75) Inventor: Akihiro Yamamura, Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 11/905,023

(22) Filed: Sep. 27, 2007

(65) Prior Publication Data

US 2008/0080057 A1    Apr. 3, 2008

(30) Foreign Application Priority Data

| Sep. 28, 2006 | (JP) | ............... 2006-265643 |
| Sep. 29, 2006 | (JP) | ............... 2006-267410 |

(51) Int. Cl.
G02B 27/10        (2006.01)

(52) U.S. Cl. .................................... 359/621

(58) Field of Classification Search .......... 359/619–626
See application file for complete search history.

(56) References Cited

U.S. PATENT DOCUMENTS

| 3,580,675 A | 5/1971 | Hieber et al. |
| 5,163,117 A | 11/1992 | Imanishi et al. |
| 5,463,498 A * | 10/1995 | Gal et al. ................. 359/622 |
| 6,363,603 B1 * | 4/2002 | Nemoto et al. ............. 359/621 |
| 6,373,635 B1 * | 4/2002 | Fujimoto et al. ........... 359/619 |

FOREIGN PATENT DOCUMENTS

| EP | 0 348 003 | 12/1989 |
| JP | 56-117201 | 9/1981 |
| JP | 63-225218 | 9/1988 |
| JP | 2000-221442 | 8/2000 |
| JP | 2000-221445 | 8/2000 |
| JP | 2001-249274 | 9/2001 |
| JP | 2001-352429 | 12/2001 |
| JP | 2002-107661 | 4/2002 |
| JP | 2003-202411 | 7/2003 |
| JP | 2003-302505 | 10/2003 |
| JP | 2005-037891 | 2/2005 |
| JP | 2006-019918 | 1/2006 |
| JP | 2006-209057 | 8/2006 |

* cited by examiner

*Primary Examiner*—Alicia M Harrington
(74) *Attorney, Agent, or Firm*—Rabin & Berdo, P.C.

(57) ABSTRACT

A lens array includes a plurality of lens groups each of which includes lenses so disposed that optical axes thereof are aligned with each other. The lens groups are arranged in a direction perpendicular to the optical axes. A light-blocking portion is provided for shielding each of the lens group from light having passed through any lens of other lens group. A largest diameter D of the lens and an arrangement interval P at which the lens groups are arranged satisfy the relationship: P<D.

33 Claims, 26 Drawing Sheets

LENS-ARRAY, EXPOSURE DEVICE, IMAGE FORMING APPARATUS AND READING APPARATUS

BACKGROUND OF THE INVENTION

This invention relates to a lens array, an exposure device, an image forming apparatus and a reading apparatus.

There is known an image forming apparatus (such as a printer, a copier, a compound machine or the like) having an array of LEDs as light emitting portions. Such an image forming apparatus uses an array of rod lenses disposed in opposition to the light emitting portions. The rod lenses are configured to focus the lights emitted by the light emitting portions onto a surface of a photosensitive drum.

Moreover, there is knows a reading device (such as a scanner) having an array of light receiving portions. Such a reading device uses an array of rod lenses disposed in opposition to the light receiving portions.

The rod lens is an optical element formed of a glass fiber impregnated with ion so that the refractive index decreases from the center portion toward the peripheral portion. The rod lens forms an erected image at the same magnification. A lens array in which rod lenses are arranged in a plurality of rows is used as an optical system for focusing an image of an object as a linear image.

As an example of a simple optical system, there is known a lens array in which rod lenses are arranged in a single row. Further, there is proposed another lens array including lens-pairs each of which includes a pair of micro lenses disposed at an interval corresponding to the focal length so that optical axes thereof are aligned with each other (see, for example, Japanese Laid-Open Patent Publication No. 2002-107661). The lens array using the micro lenses has the same function as the lens array using the rod lenses.

However, in the conventional lens array using the rod lenses, there is a difference in optical properties between the vicinity of the optical axis of each rod lens and the periphery of each rod lens, and therefore the degradation of the resolution and the reduction of the amount of light may occur with a cycle corresponding to the interval at which the rod lenses are arranged. Similarly, in the lens array using the micro lenses, there is a difference in optical properties between the vicinity of the optical axis of each micro lens and the periphery of each micro lens, and therefore the degradation of the resolution and the reduction of the amount of light may occur with a cycle corresponding to the interval at which the micro lenses are arranged.

In this regard, there is proposed another lens array in which micro lenses are arranged in a staggered manner (see, for example, Japanese Laid-Open Patent Publication No. 2000-221445). It is possible to arrange such lens arrays in the direction of the optical axis at an interval corresponding to the focal length. However, in such a case, the amount of light may be reduced as the resolution is enhanced.

SUMMARY OF THE INVENTION

An object of the present invention is to solve the above described problems, and an object of the present invention is to provide a lens array, an exposure device, an image forming apparatus and a reading apparatus capable of enhancing the resolution and increasing the amount of light.

The present invention provides a lens array including a plurality of lens groups each of which includes lenses so disposed that optical axes thereof are aligned with each other. The lens groups are arranged in a direction perpendicular to the optical axes. A light-blocking portion is provided for shielding each of the lens groups from light having passed through any lens of other lens groups. A largest diameter D of each lens, and an arrangement interval P at which the lens groups are arranged satisfy the relationship: P<D.

Since the largest diameter D of the lens is larger than the arrangement interval P of the lens groups, it becomes possible to prevent the degradation of the resolution and the reduction of the amount of light (that otherwise occur with a cycle corresponding to the arrangement interval of the lenses).

The present invention also provides a lens array including a plurality of lenses. The plurality of lenses include first and second lenses arranged in a first direction at an arrangement interval $P_Y$, and third and fourth lenses arranged in a second direction at an arrangement interval $P_N$. The arrangement intervals $P_Y$ and $P_N$ satisfy the relationship: $P_Y > P_N$.

Since the arrangement interval $P_N$ in the second direction is smaller than the arrangement interval $P_Y$ between the lenses in the first direction, the resolution can be enhanced, and the amount of light can be increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Hereinafter, embodiments of the present invention will be described with reference to the attached drawings. In this regard, a printer (as an image forming apparatus) and a reading apparatus will be described. The printer uses a toner, i.e., a developer, composed of a resin containing a pigment (as a coloring agent), and is configured to form an image such as a color image or a monochrome image on a sheet as a medium in accordance with image data.

Figure 1:
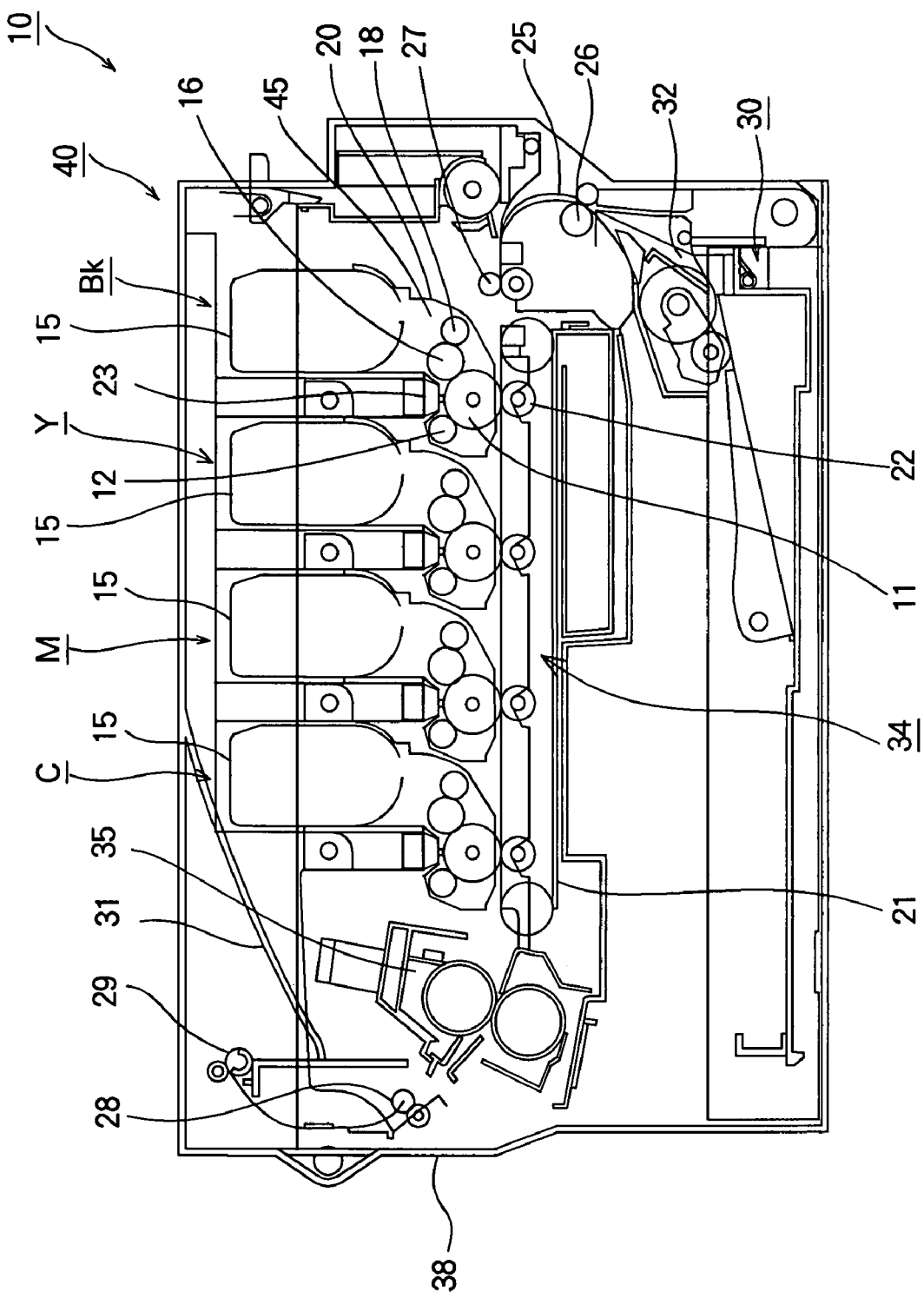
FIG. 1 is a schematic view showing a printer according to the first embodiment of the present invention.

FIG. 1 is a schematic view showing a printer according to the first embodiment of the present invention.

In FIG. 1, a printer 10 includes a main body (i.e., an apparatus main body) in which a substantially S-shaped feeding path 25 is provided for feeding a not shown sheet (i.e., a medium). Feeding rollers 26, 27, 28 and 29 are disposed along the feeding path 25. Further, image forming units Bk, Y, M and C are disposed along the feeding path 25, for forming the toner images (developer images) of the respective colors. A transfer unit 34 is disposed below the image forming units Bk, Y, M and C, for feeding the sheet and for transferring the respective toner images to the sheet. The feeding path 25 is formed between the respective image forming units Bk, Y, M and C and the transfer unit 34. The transfer unit 34 constitutes a belt driving unit.

LED heads 23 (i.e., exposure devices or recording heads) are disposed in the printer 10 in such a manner that the LED heads 23 face respective photosensitive drums (i.e., image bearing bodies) 11 of the image forming units Bk, Y, M and C. A fixing unit 35 is disposed on the downstream side of the transfer unit 34, for fixing the toner image (having been transferred to the sheet) to the sheet.

In each of the image forming units Bk, Y, M and C, the photosensitive drum 11 has an electrically chargeable surface, and rotates at a predetermined speed. The surface of the photosensitive drum 11 is exposed with light emitted by the LED head 23, and the electric charge of the exposed surface of the photosensitive drum 11 is removed, so that the latent image is formed thereon. A charging roller 12 (i.e., a charging device) is urged against the photosensitive drum 11 at a constant pressure. The charging roller 12 rotates in the direction opposite to the rotational direction of the photosensitive drum 11 and applies a predetermined voltage to the surface of the photosensitive drum 11.

Further, a developing device 45 is disposed in opposition to the photosensitive drum 11, and develops the latent image to form a toner image. The developing device 45 includes a developing roller 16 (i.e., a developer bearing body) causing the toner to adhere to the photosensitive drum 11, a not shown developing blade regulating the thickness of the toner layer formed on the surface of the developing roller 16, a toner supply roller 18 (i.e., a developer supply roller) supplying the toner to the developing roller 16, and the like. The developing roller 16 is urged against the photosensitive drum 11 at a constant pressure, and rotates in the direction opposite to the rotational direction of the photosensitive drum 11. The toner supply roller 18 is urged against the developing roller 16 at a constant pressure, and rotates in the same direction as the rotational direction of the developing roller 16.

The photosensitive drum 11, the charging roller 12, the developing device 45 and the like are housed in a casing 20 that constitutes a main body of the image forming unit. On the upper side of each casing 20, a toner cartridge 15 (as a developer storing portion) storing the toner is detachably attached to the casing 20.

The transfer unit 34 includes a movable transfer belt 21, and transfer rollers 22 (i.e., transfer members) respectively disposed in opposition to the photosensitive drums 11. The transfer belt 21 and the transfer rollers 22 are applied with predetermined voltages by not shown power sources, and transfer the respective toner images from the photosensitive drums 11 to the sheet.

The printer 10 includes a lower frame 38 and an upper frame 40 swingably provided on the lower frame 38. The upper frame 40 includes a stacker 31 for stacking the ejected sheets thereon. Below the transfer unit 34, a sheet cassette 30 (i.e., a media storing portion) is provided at the end portion of the sheet feeding path 25, and stores the sheets. The sheet cassette 30 has a sheet pickup portion 32 that picks up and feeds the sheet out of the sheet cassette 30.

The operation of the above described printer 10 will be described.

In the image forming units Bk, Y, M and C, the charging rollers 12 uniformly charge the surfaces of the photosensitive drums 11. The LED heads 23 expose the surfaces of the photosensitive drums 11, and form latent images thereon. Then, the developing devices 45 develop the latent images and form toner images of the respective colors.

The sheet is picked up by the sheet pickup portion 32, is fed by the feeding rollers 26 and 27, and adheres to the transfer belt 21 by means of an electrostatic effect. By the movement of the transfer belt 21, the sheet is fed through between the image forming units Bk, Y, M and C and the transfer unit 34, and the toner images of the respective colors are transferred to the sheet in an overlapping manner, with the result that the color toner image is formed on the sheet. Then, the sheet reaches the fixing unit 35, and the color toner image is fixed to the sheet. Then, the sheet is further fed by the feeing rollers 28 and 29, and is ejected to the stacker 31.

The printer 10 includes an external interface (not shown) for communicating with an external device and for receiving print data. The printer 10 further includes a control unit that receives the print data via the external interface and controls the whole of the printer.

The LED head 23 will be described.

Figure 2:
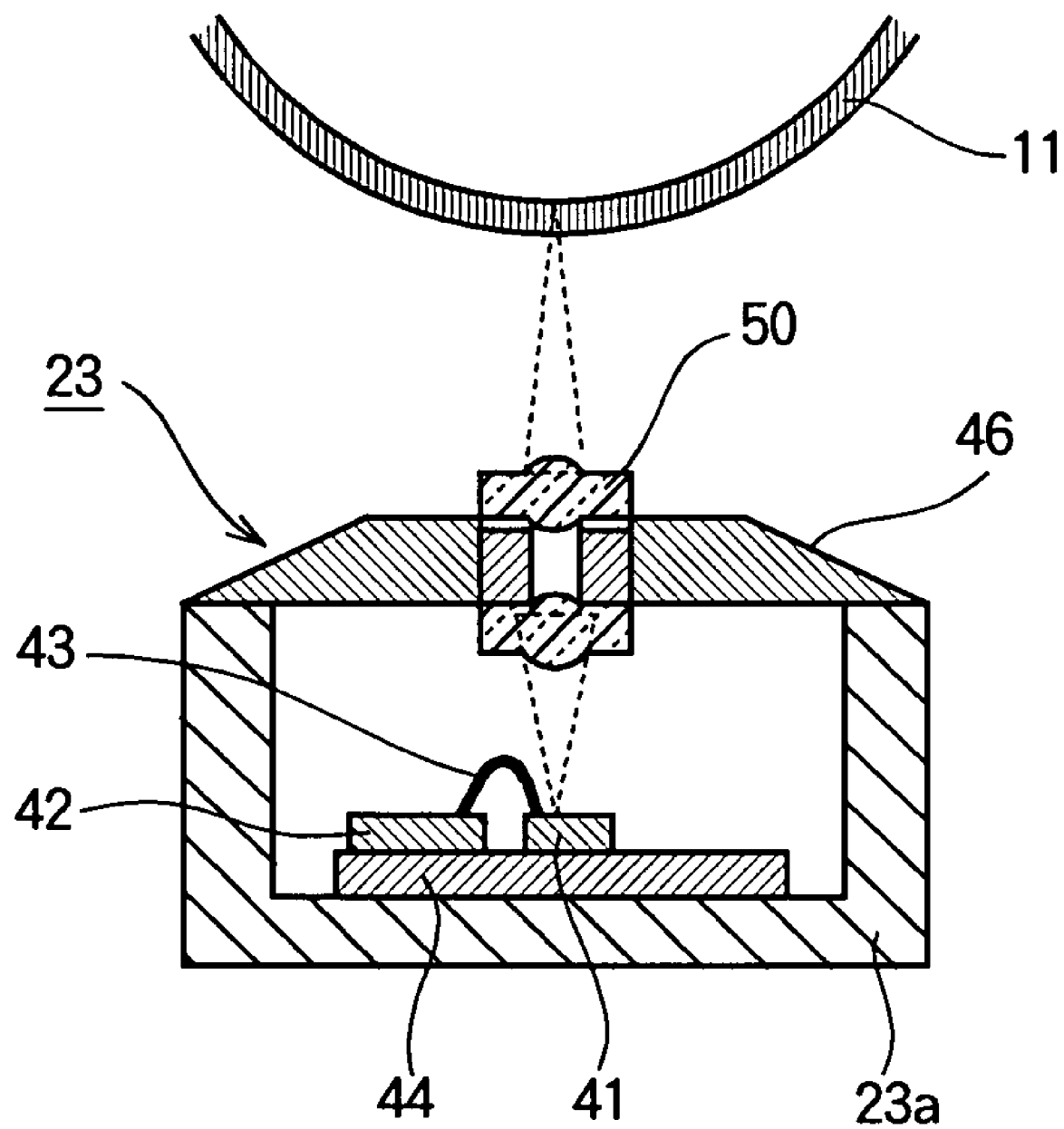
FIG. 2 is a cross sectional view showing an LED head according to the first embodiment of the present invention.

FIG. 2 is a cross sectional view of the LED head 23 according to the first embodiment of the present invention.

As shown in FIG. 2, the LED head 23 includes a lens array 50. The lens array 50 is fixed to a supporting body 23a by means of a holding member 46.

The LED head 23 includes light emitting portions 41 that emit light to the photosensitive drum 11. The light emitting portions 41 include a plurality of LED elements (i.e., light emitting elements) linearly arranged. In this embodiment, the number of the LED elements per inch (approximately 25.4 mm) is 600. A light-blocking member (not shown) is disposed between the light emitting portions 41 and the lens array 50.

The light emitting portions 41 and a driver IC 42 for controlling the light emission of the LED elements of the light emitting portions 41 are provided on a wiring substrate 44 (disposed on the supporting body 23a). The light emitting portions 41 and the driver IC 42 are connected with each other by means of wires 43.

The operation of the above described LED head 23 will be described.

First, the above described control unit generates control signal for the LED head 23 in accordance with the image data, and sends the control signal to the driver IC 42. The driver IC 42 causes the LED elements of the light emitting portions 41 to respectively emit lights of predetermined amounts according to the control signal. Then, the lights emitted by the respective LED elements are incident on the lens array 50, pass through the lens array 50, and are focused on the photosensitive drum 11, so that the focused images of the light emitting portions 41 are formed on the photosensitive drum 11.

The lens array 50 will be described.

Figure 3A:
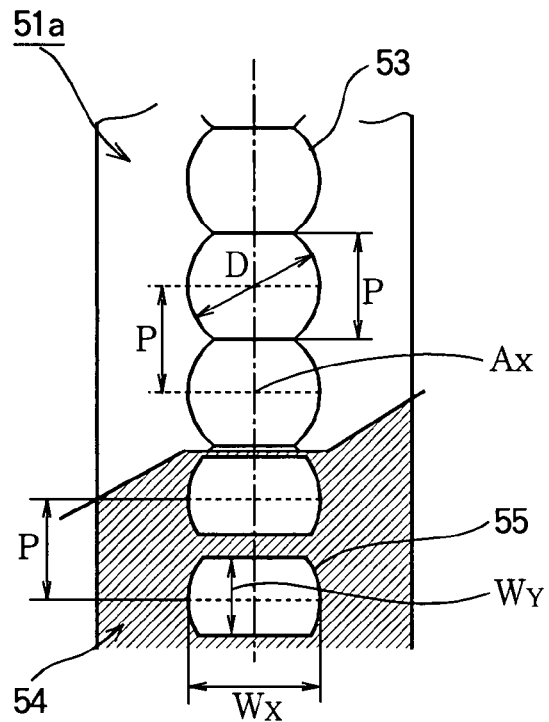
FIG. 3A is a partially cutaway plan view showing a lens array according to the first embodiment of the present invention.
Figure 3B:
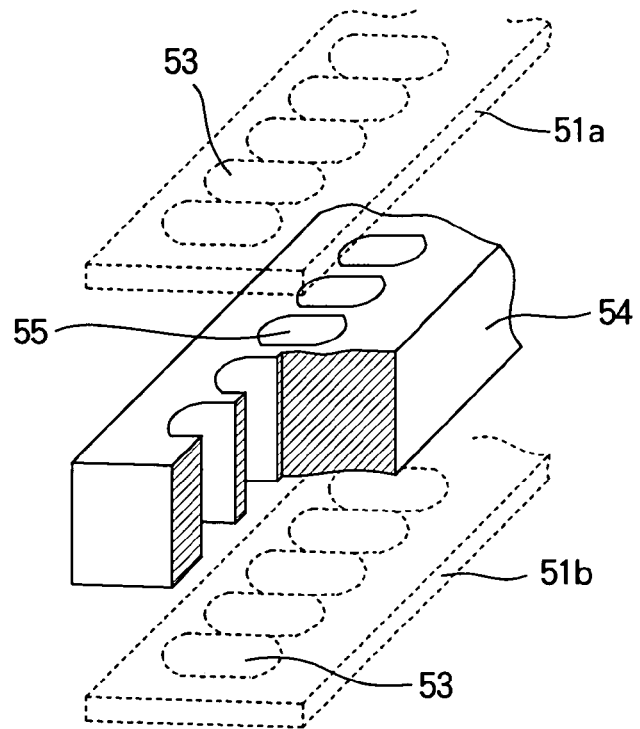
FIG. 3B is a schematic perspective view showing a light-blocking member of the lens array according to the first embodiment of the present invention.
Figure 4:
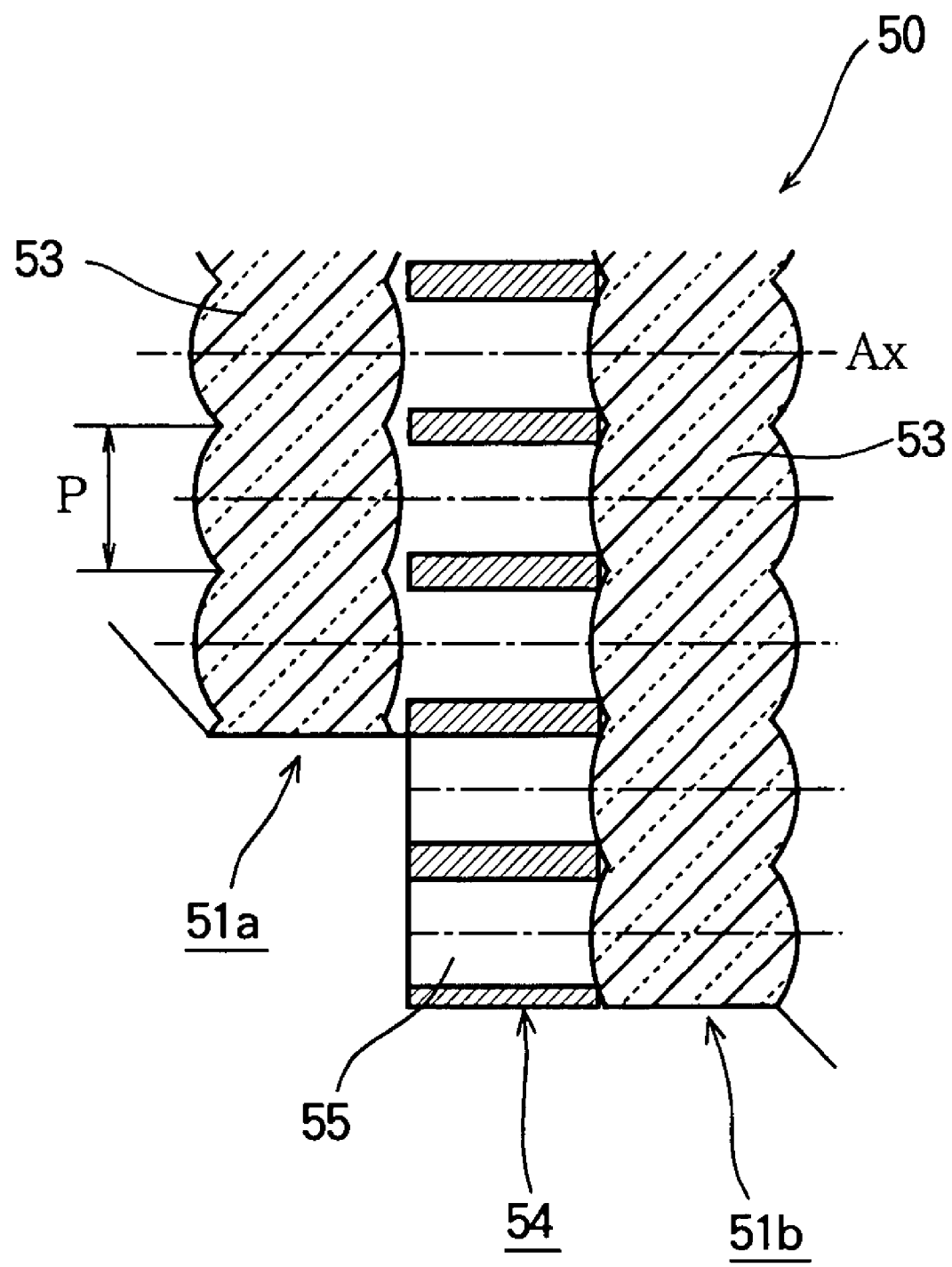
FIG. 4 is a longitudinal sectional view of the lens array according to the first embodiment of the present invention.
Figure 5:
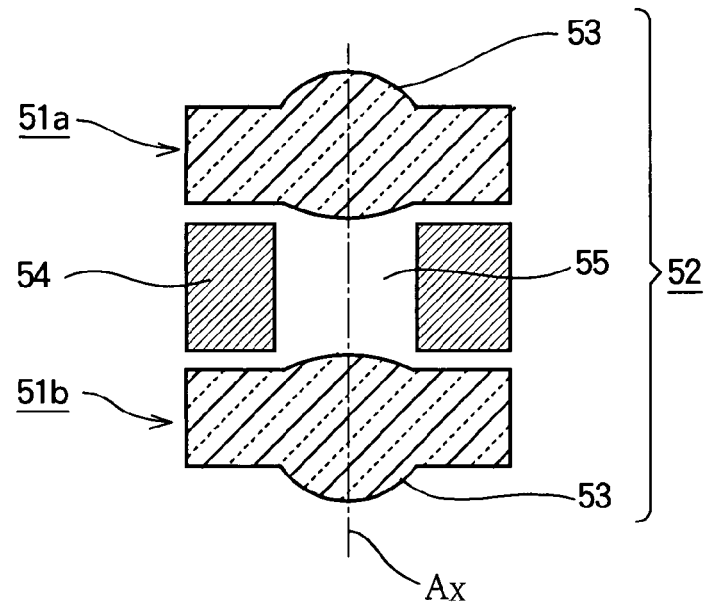
FIG. 5 is a cross sectional view of the lens array according to the first embodiment of the present invention.

FIG. 3A is a partially cutaway plan view showing the lens array 50 according to the first embodiment of the present invention. FIG. 3B is a schematic perspective view of a light-blocking portion of the lens array. FIGS. 4 and 5 are a longitudinal sectional view and a cross sectional view showing the lens array 50 according to the first embodiment of the present invention.

As shown in FIGS. 3A through 5, the lens array 50 includes a pair of lens plates 51a and 51b that face with each other. The lens array 50 further includes a light-blocking portion 54 disposed between the lens plates 51a and 51b and made of material that blocks the light. The light-blocking portion 54 has a plurality of openings 55. A plurality of micro lenses 53 are integrally formed on each of the lens plates 51a and 51b, and are disposed at the center portions of the lens plates 51a and 51b in the width direction. The micro lenses 53 are arranged in the direction perpendicular to the optical axes of the micro lenses 53 (i.e., arranged in the longitudinal direction of the lens plates 51a and 51b). Each of the micro lenses 53 of the lens plate 51a and the corresponding one of the micro lenses 53 of the lens plate 51b have optical axes aligned with each other, and constitute a lens-pair (i.e., a lens group) 52. Each micro lens 53 constitutes an optical element that forms an inverted image at a reduced magnification. The lens pair 52 constitutes an optical element that forms an erected image at the same magnification.

In FIG. 3A, the curved surface of each micro lens 53 has a rotationally-symmetric shape with respect to the optical axis (indicated by the mark Ax in FIG. 3A). The curved surface of the micro lens 53 is so shaped that the curved surface of the micro lens 53 is cut by a plane parallel to the optical axis in the vicinity of the border with the adjacent micro lens 53. A largest diameter D of the micro lens 53 is defined as a diameter of a circle which circumscribes the micro lens 53 and whose center is aligned with the optical axis of the micro lens 53.

The lens plates 51a and 51b and the light-blocking portion 54 are so disposed that the optical axes of the lens pairs 52 are aligned with the centers of the openings 55. Here, an interval (center-to-center distance) at which the micro lenses 53 are arranged is referred to as an arrangement interval P. In this embodiment, the arrangement interval P of the micro lenses 53 and the diameter D of each micro lens 53 are so set as to satisfy the relationship:

$P<D$.

The opening 55 of the light-blocking portion 54 has a dimension (i.e., an opening dimension in the width direction) $W_X$ in the direction perpendicular to the direction in which the micro lenses 53 are arranged, and a dimension (i.e., an opening dimension in the arranging direction) $W_Y$ in the direction parallel to the direction in which the micro lenses 53 are arranged. The dimensions $W_X$ and $W_Y$ satisfy the relationship:

$W_Y<W_X$.

The opening 55 has a substantially cylindrical shape whose diameter is the same as the opening dimension $W_X$ and whose center is aligned with the optical axis, and bounded by two planes parallel to the optical axis disposed at an interval which is the same as the opening dimension $W_Y$.

Here, a lens array of a comparative example is prepared for the verification of the advantage of this embodiment.

A lens array 50' (see FIGS. 9 and 10) of the comparative example is so configured that the arrangement interval P of the micro lenses 53' is the same as the diameter D of each micro lens 53', and the micro lens 53' has a circular shape as seen in the direction of the optical axis. In the lens array 50' of the comparative example, the dimensions $W_Y$ and $W_X$ of the opening 55' of the light-blocking portion 54' are the same as each other. In other words, the opening 55' has a cylindrical shape whose diameter is the same as the opening dimension $W_Y$ and whose center is aligned with the optical axis.

In the lens array 50 of this embodiment and the lens array 50' of the comparative example, the lens plates 51a and 51b (51a' and 51b') are formed of cycloolefin-based resin "ZEONEX E48R" (product name) manufactured by Nihon Zeon Corporation and formed by resin molding.

In the lens array 50 of this embodiment and the lens array 50' of the comparative example, the light-blocking portion 54 (54') is formed of polycarbonate and formed by resin molding.

Figure 6:
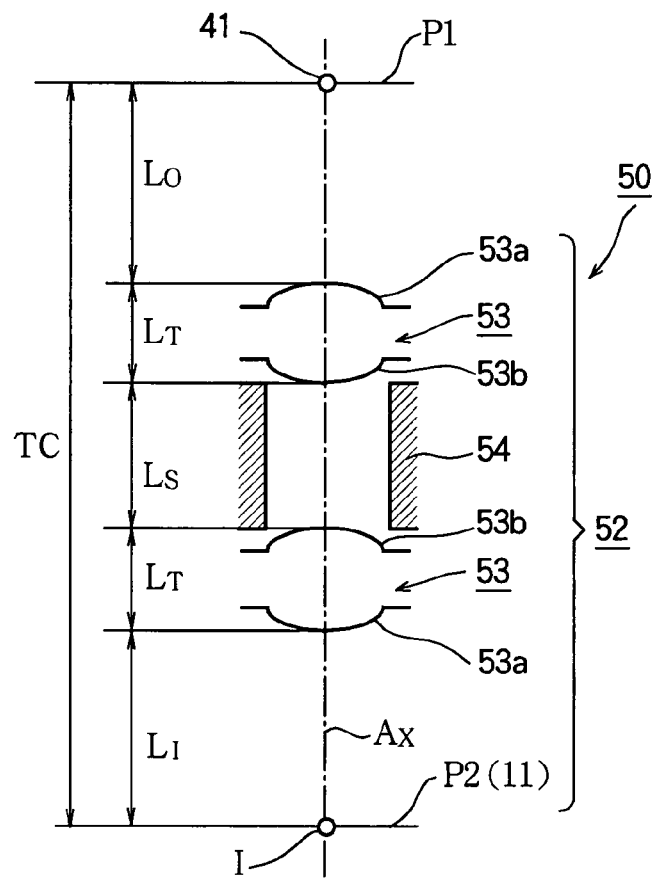
FIG. 6 shows an arrangement of optical elements of the lens array according to the first embodiment of the present invention.

FIG. 6 is a schematic view showing an arrangement of optical elements according to the first embodiment of the present invention.

As shown in FIG. 6, the mark $L_O$ indicates the distance between the lens array 50 and the light emitting portion 41 (i.e., the distance between an object plane and a lens surface), and is defined by the distance between the apex of an outer curved surface 53a of the micro lens 53 and a plane (i.e., an object plane P1) on which the light emitting portions 41 are arranged. The mark $L_I$ indicates the distance (i.e., the distance between an image plane and a lens surface) between the lens array 50 and the photosensitive drum 11 on which an image I is focused, and is defined by the distance between the apex of an outer curved surface 53a of the micro lens 53 and a plane (i.e., an image plane P2) on which the photosensitive drum 11 is disposed. The mark $L_T$ indicates the lens thickness $L_T$, and is defined by the distance between the outer curved surface 53a and the inner curved surface 53b of the micro lens 53. The mark $L_S$ indicates the distance between lens surfaces, and is defined by the distance between the respective inner curved surfaces 53b of the micro lenses 53 of the lens-pair 52. The mark TC indicates the distance between the image plane P2 and the object plane P1, and is defined by the distance between the photosensitive drum 11 and the light emitting portion 41.

Further, the outer curved surface 53a and the inner curved surface 53b of the micro lens 53 are respectively rotationally-symmetric high-order aspheric surfaces, and expressed as the following equations (1) and (2):

$$Z_0(r) = \frac{\frac{r^2}{C_0}}{1 + \sqrt{1 - \left(\frac{r}{C_0}\right)^2}} + A_0 \cdot r^4 + B_0 \cdot r^6. \tag{1}$$

$$Z_1(r) = \frac{\frac{r^2}{C_1}}{1 + \sqrt{1 - \left(\frac{r}{C_1}\right)^2}} + A_1 \cdot r^4 + B_1 \cdot r^6. \tag{2}$$

Each of the functions $Z_O(r)$ and $Z_I(r)$ indicates a rotating coordinate system whose axis is parallel to the optical axis of the micro lens 53 and in which the radial coordinate is expressed as "r". The apexes of the outer curved surface 53a and the inner curved surface 53b of the micro lens 53 are defined as original points. The direction from the object plane toward the image plane is expressed as being positive number. The mark $C_O$ indicates a radius of curvature of the outer curved surface 53a. The mark $A_O$ indicates a fourth-order aspherical coefficient of the outer curved surface 53a. The mark $B_O$ indicates a sixth-order aspherical coefficient of the outer curved surface 53a. The mark $C_I$ indicates a radius of curvature of the inner curved surface 53b. The mark $A_I$ indicates a fourth-order aspherical coefficient of the inner curved surface 53b. The mark $B_I$ indicates a sixth-order aspherical coefficient of the inner curved surface 53b.

Although the micro lenses 53 are integrally formed with the lens plates 51a and 51b, it is also possible to individually form the micro lenses 53 and to fix the micro lenses 53 to the lens plates 51a and 51b at predetermined intervals.

Although the outer curved surface 53a and the inner curved surface 53b are rotationally-symmetric high-order aspheric surfaces in this embodiment, the outer curved surface 53a and the inner curved surface 53b can be spherical surfaces. Moreover, the outer curved surface 53a and the inner curved surface 53b can be conic surfaces (such as paraboloidal surfaces, ellipsoidal surfaces, hyperboloidal surfaces or the like), toroidal surfaces (asymmetric in respective directions perpendicular to the optical axis) and cylindrical surfaces or the like. Further, the outer curved surface 53a and the inner curved surface 53b can be conventional free curved surfaces.

The micro lens 53 is formed of a transparent material (that transmits the light from the light source) having a uniform refractive index and having predetermined curved surfaces. However, it is also possible to use a lens, optical fibers or the like having a predetermined distribution of refractive index.

Further, although the light-blocking portion 54 is formed by resin molding in this embodiment, the light-blocking portion 54 can be formed by cutting work. Further, it is also possible to form a light-blocking pattern of a light-blocking material (that blocks the light emitted by the light source) on a material that transmits the light. It is also possible to form a light-blocking pattern using a light-blocking material partially on the lens plates 51a and 51b. It is also possible to partially roughen the surfaces of the lens plates 51a and 51b to block the light. It is also possible to partially cut off the lens plates 51a and 51b to prevent the incidence of a part of the light.

In this embodiment, the LED elements (i.e., the LED array) are used as the light emitting portions 41. However, it is also possible to use organic EL (Electric Luminescence) elements as the light emitting portions 41. Further, it is also possible to use semiconductor lasers as the recording head of the printer 10. It is also possible to use a light source such as a fluorescent lamp, halogen lamp or the like together with a shutter composed of a liquid crystal display.

The operation of the above described lens array 50 will be described.

Figure 7:
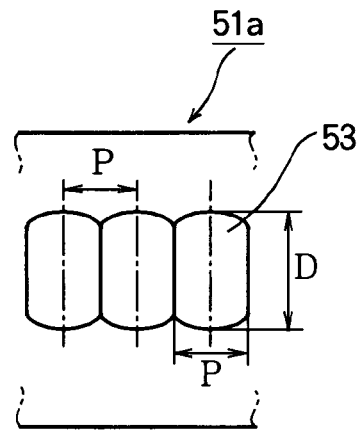
FIG. 7 is a plan view showing the lens array according to the first embodiment of the present invention.
Figure 8:
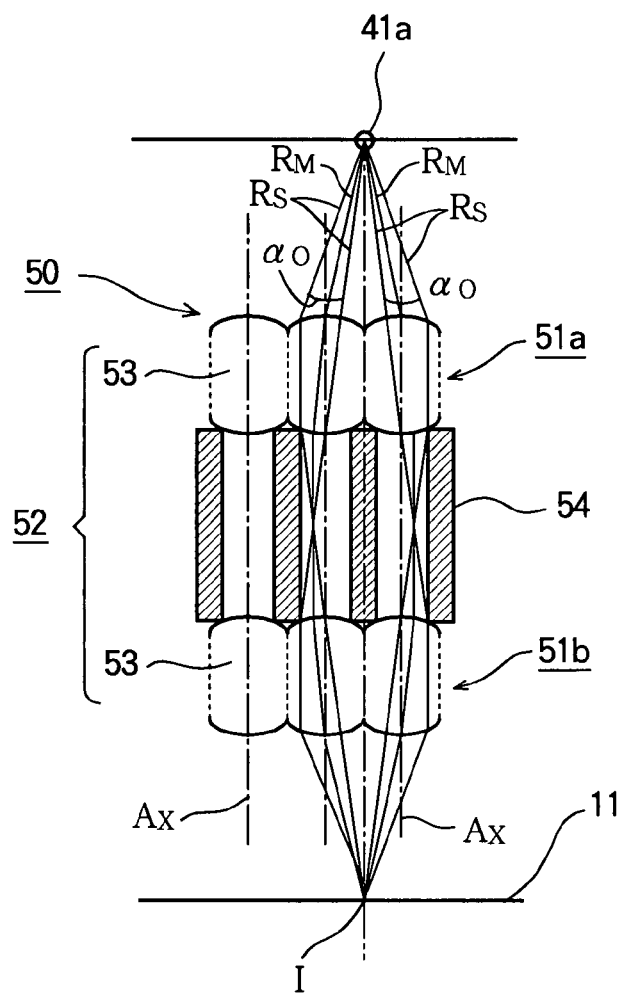
FIG. 8 is a sectional view showing the lens array according to the first embodiment of the present invention.
Figure 9:
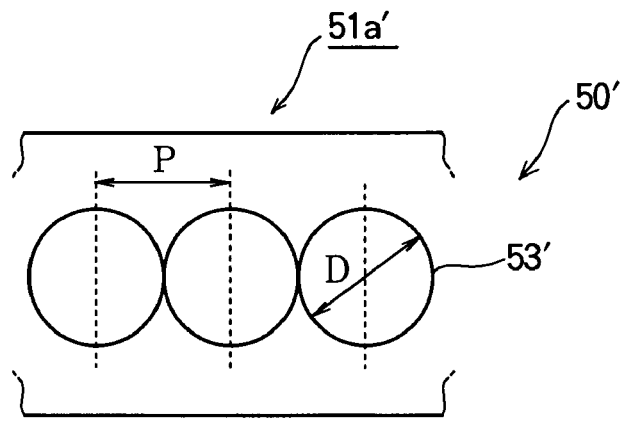
FIG. 9 is a plan view showing a lens array according to the comparative example.
Figure 10:
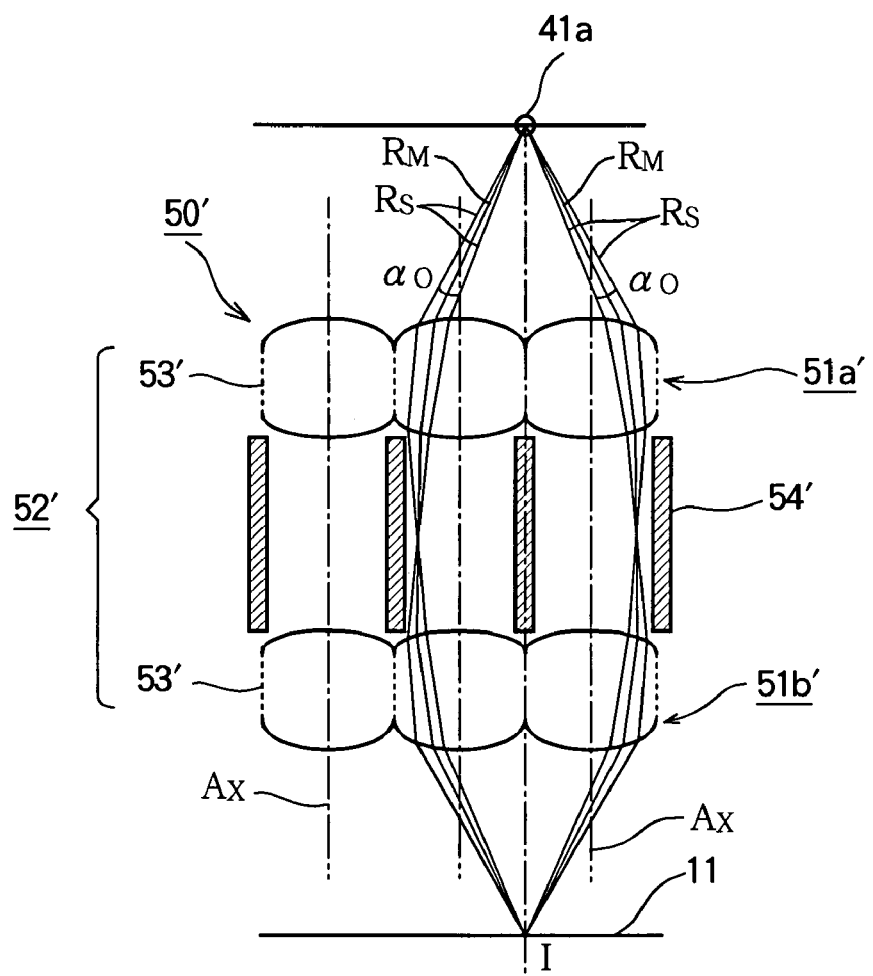
FIG. 10 is a sectional view showing the lens array according to the comparative example.

FIGS. 7 and 8 are a plan view and a sectional view showing the lens array of the first embodiment of the present invention. FIGS. 9 and 10 are a plan view and a sectional view showing the lens array of the comparative example with respect to the first embodiment of the present invention.

The lens array 50 of the first embodiment and the lens array 50' of the comparative example are configured as shown in TABLE 1.

TABLE 1

| MARK | PROPERTIES | EXAMPLE OF 1ST EMBODIMENT | COMPARATIVE EXAMPLE |
|---|---|---|---|
| P | ARRANGEMENT INTERVAL OF MICRO LENSES (mm) | 1.200 | 1.600 |
| $L_O$ | DISTANCE BETWEEN OBJECT PLANE AND LENS SURFACE (mm) | 4.600 | 4.600 |
| D | DIAMETER OF MICRO LENS (mm) | 1.600 | 1.600 |
| $C_O$ | RADIUS OF CURVATURE OF OUTER CURVED SURFACE (mm) | 1.1210 | 1.1210 |
| $A_O$ | 4TH ORDER ASPHERICAL COEFFICIENT OF OUTER CURVED SURFACE | −0.1327 | −0.1327 |
| $B_O$ | 6TH ORDER ASPHERICAL COEFFICIENT OF OUTER CURVED SURFACE | −0.0098 | −0.0098 |
| $C_I$ | RADIUS OF CURVATURE OF INNER CURVED SURFACE (mm) | −1.2365 | −1.2365 |
| $A_I$ | 4TH ORDER ASPHERICAL COEFFICIENT OF INNER CURVED SURFACE | 0.1960 | 0.1960 |
| $B_I$ | 6TH ORDER ASPHERICAL COEFFICIENT OF INNER CURVED SURFACE | 0.1576 | 0.1576 |
| $L_T$ | LENS THICKNESS (mm) | 2.000 | 2.000 |
| $L_S$ | DISTANCE BETWEEN LENS SURFACES (mm) | 2.480 | 2.480 |
| $W_Y$ | OPENING DIMENSION OF LIGHT-BLOCKING PORTION IN ARRANGING DIRECTION (mm) | 0.800 | 1.400 |
| $W_X$ | OPENING DIMENSION OF LIGHT-BLOCKING PORTION IN WIDTH DIRECTION (mm) | 1.400 | 1.400 |
| $L_I$ | DISTANCE BETWEEN IMAGE PLANE AND LENS SURFACE (mm) | 4.600 | 4.600 |
| TC | DISTANCE BETWEEN IMAGE PLANE AND OBJECT PLANE (mm) | 15.680 | 15.680 |

In FIGS. 8 and 10, a reference numeral 41a indicates a light emitting portion (among the light emitting portions 41) disposed on a position corresponding to a border between adjacent micro lenses 53 (53').

When the lens array 50' of the comparative example is used to form the focused image I of the light emitting portion 41a, the resolution and the amount of light are smaller than those when the lens array 50 of the first embodiment of the present invention is used.

FIGS. 8 and 10 show respective paths of the lights passing through the lens arrays 50 and 50' and reaching the photosensitive drum 11 to form the focused image I. A light ray traveling along the shortest path is defined as a principal ray $R_M$. A light ray travelling along the outermost path from the principal ray $R_M$ is defined as a rim ray Rs.

The light emitted by the light emitting portion 41a is incident on the micro lens 53 (53') on the light emitting portion 41a side of the lens pair 52 (52'), forms the focused image of the light emitting portion 41a at the reduced magnification, and is incident on the micro lens 53 (53') on the photosensitive drum 11 side. The micro lens 53 (53') of the photosensitive drum 11 side forms an inverted image of the image (having been focused at the reduced magnification) of the light emitting portion 41a at the enlarged magnification. In other words, the lens pair 52 (52') focuses an erected image of the light emitting portion 41a on the surface of the photosensitive drum 11 at the same magnification.

As shown in FIGS. 8 and 10, in the lens array 50 of the first embodiment of the present invention, the light emitting portion 41a is closer to the optical axis Ax of the micro lens 53, compared with the lens array 50' of the comparative example.

Generally, when an image is focused using the lens, the aberration becomes smaller and the amount of light increases, as the object is closer to the optical axis of the lens.

In the lens array 50 of this embodiment, the rim ray $R_S$ of the light emitted by the light emitting portion 41a has a larger angle $α_0$, compared with the rim ray $R_S$ of the lens array 50' of the comparative example. Therefore, when the lens array 50 according to the first embodiment is used, the amount of the light incident on the micro lens 53 (of the total amount of the light emitted by the light emitted portion 41a) is larger than that when the lens array 50' of the comparative example is used. Accordingly, the focused image I of the light emitting portion 41a using the lens array 50 of the first embodiment is brighter than the focused image I of the light emitting portion 41a using the lens array 50' of the comparative example.

As a result, the optical axes Ax of the micro lenses 53 of the lens array 50 of the first embodiment are closer to the light emitting portions 41a than the optical axes Ax of the micro lenses 53' of the lens array 50' of the comparative example. Further, the aberration in the focused image I is smaller when the lens array 50 of the first embodiment is used than when the lens array 50' of the comparative example is used. Therefore, according to the first embodiment of the present invention, it becomes possible to form a sharp image and to obtain a bright image (with large amount of light). Further, it becomes possible to prevent the degradation of the resolution and the reduction of the amount of light (that otherwise occur with a cycle corresponding to the arrangement interval of the micro lenses 53 of the lens array 50).

A description will be made as to the measurements on the MTF (Modulation Transfer Function, i.e., amplitude transfer function) and the amount of light using the LED head 23 of the first embodiment and using the LED head of the comparative example.

The MTF indicates a resolution of the focused image, i.e., a contrast in the amount of light forming the focused image by means of the activated LED elements of the LED head 23.

When the highest contrast in the amount of light of the focused image is obtained and when the highest resolution of the LED head 23 is obtained, the MTF is defined to be 100%. As the MTF becomes smaller, the contrast in the amount of light (forming the focused image) decreases, and the resolution decreases.

Figure 11:
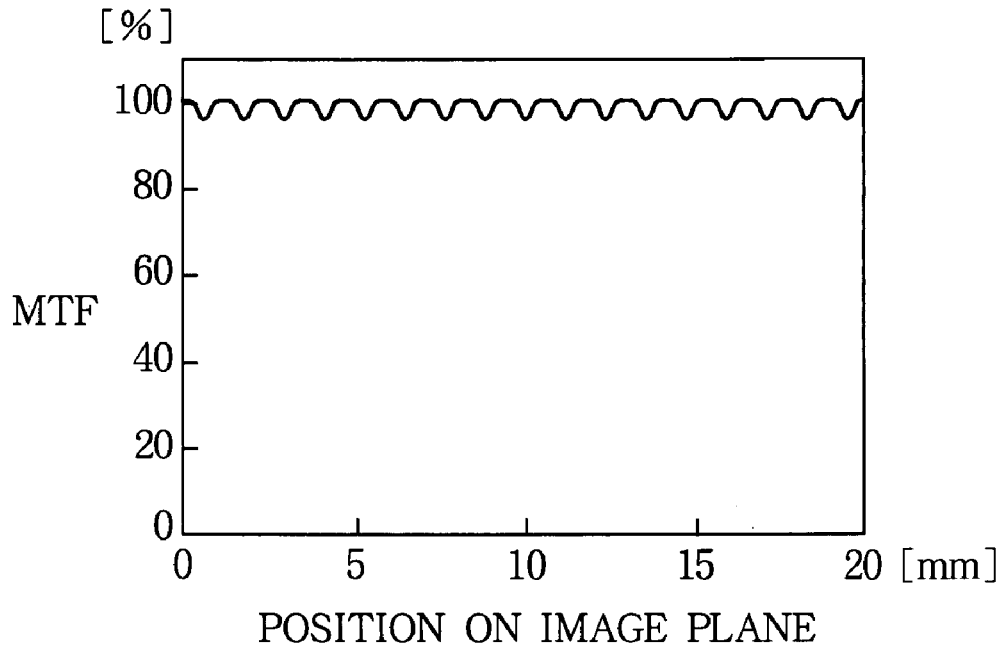
FIG. 11 shows the MTF of the lens array according to the first embodiment of the present invention.
Figure 12:
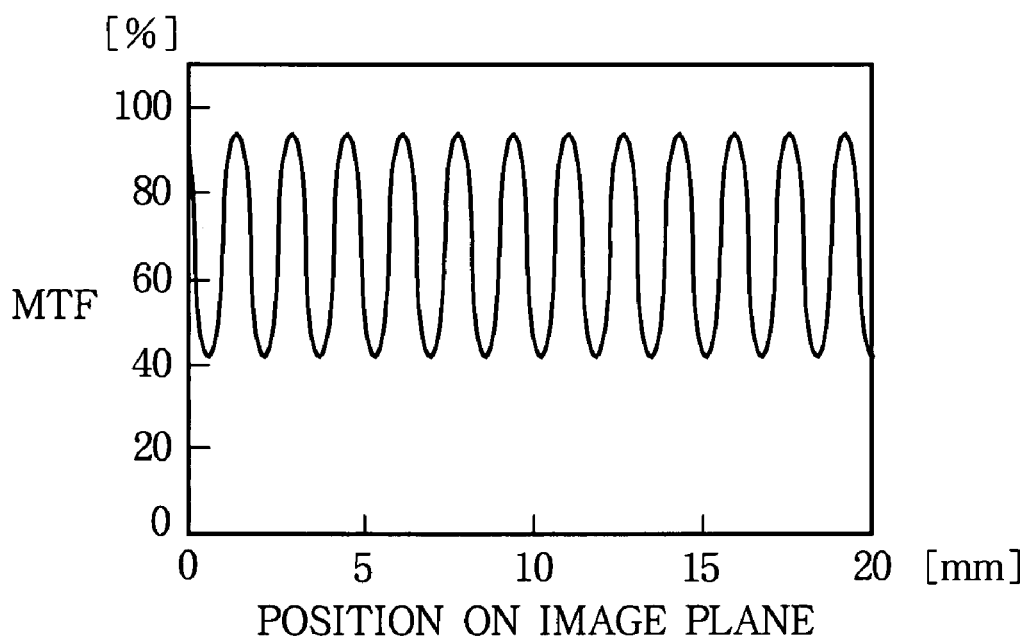
FIG. 12 shows the MTF of the lens array according to the comparative example.
Figure 13:
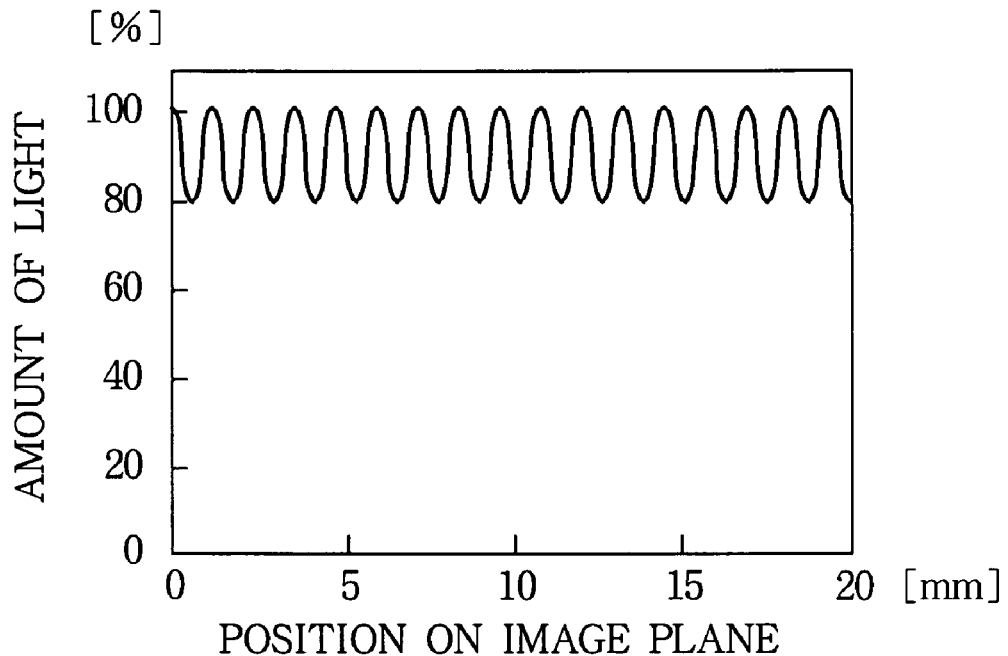
FIG. 13 shows the amount of light of the lens array according to the first embodiment of the present invention.
Figure 14:
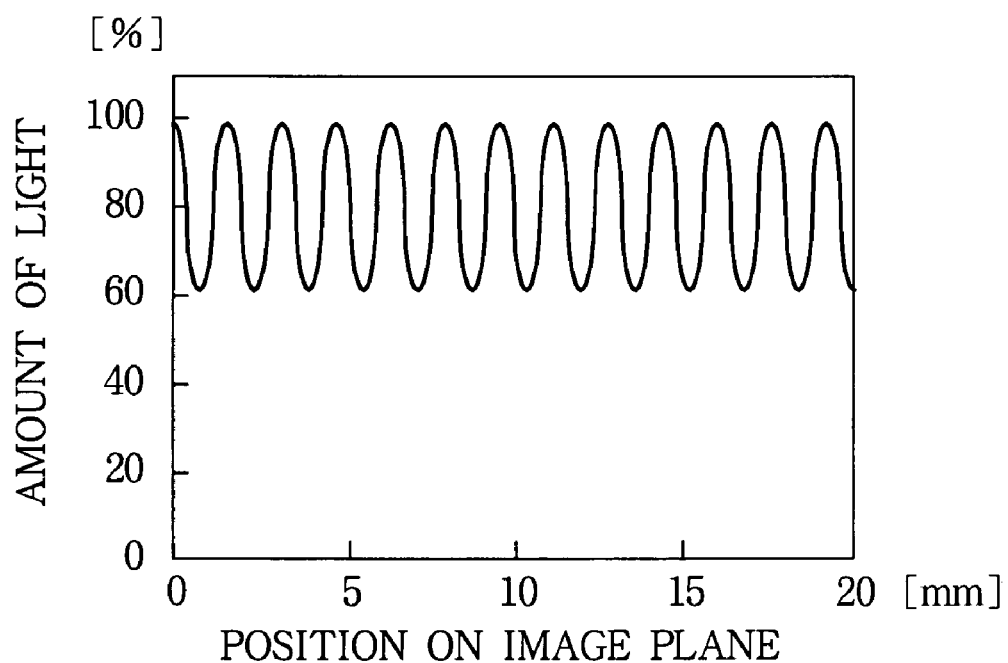
FIG. 14 shows the amount of light of the lens array according to the comparative example.

FIG. 11 is a graph showing the MTF of the lens array of the first embodiment of the present invention. FIG. 12 is a graph showing the MTF of the lens array of the comparative example. FIG. 13 is a graph showing the distribution of the amount of light of the lens array of the first embodiment of the present invention. FIG. 14 is a graph showing the distribution of the amount of light of the lens array of the comparative example. In FIGS. 11 and 12, the horizontal axis indicates the position on the image plane, and the vertical axis indicates the MTF. In FIGS. 13 and 14, the horizontal axis indicates the position on the image plane, and the vertical axis indicates the amount of light.

In this case, the MTF (%) is defined as follows:

$$MTF=((I_{max}-I_{min})/(I_{max}+I_{min}))\times 100(\%)$$

where $I_{max}$ is a maximum of the amount of light forming the focused image, and $I_{min}$ is a minimum of the amount of light between the focused images adjacent to each other.

On the measurement of the MTF and the amount of light, the lens array 50 of the first embodiment and the lens array 50' of the comparative example are respectively mounted on the LED head 23 of the color LED printer having the resolution of 600 dpi. A microscopic digital camera is used to take the focused image at a position distanced from the outer curved surface 53 on the image plane side (the photosensitive drum 11 side) by the distance $L_I$ (i.e., the distance L1 between the image plane and the lens surface). Based on the image taken by the microscopic digital camera, the distribution of the amount of light forming the focused image of the light emitting portion is analyzed, and the MTF and the amount of light are calculated. The MTF on each position is expressed as a proportion (percentage) to the maximum value of the MTF. The amount of light on each position is expressed as a proportion (percentage) to the maximum value of the amount of light.

In the LED head 23 of the first embodiment (and in the LED head of the comparative example), 600 LED elements are arranged per inch (approximately 25.4 mm). On the measurement of the MTF, the LED elements are alternately activated. On the measurement of the amount of light, all of the LED elements are activated at the same time. Among the experimental results, FIGS. 11 through 14 show the experimental results on the positions in the range of 20 mm.

In the LED head using the lens array 50' of the comparative example, the range of fluctuation of the MTF is approximately 50% as shown in FIG. 12. In contrast, in the LED head 23 using the lens array 50 of the first embodiment of the present invention, the range of fluctuation of the MTF is approximately 5% as shown in FIG. 11.

Further, in the LED head using the lens array 50' of the comparative example, the range of fluctuation of the amount of light is approximately 40% as shown in FIG. 14. In contrast, in the LED head 23 using the lens array 50 of the first embodiment of the present invention, the range of fluctuation of the amount of light is approximately 20% as shown in FIG. 13.

In this regard, when the fluctuation of the amount of light is less than or equal to 30%, it is possible to control the LED head 23 so that the respective LED elements emit lights of a constant amount.

It is found that, when the LED head 23 of the first embodiment of the present invention is controlled by the driver IC 42 so that the LED elements emit constant amount of lights, the range of fluctuation can be reduced to less than or equal to 1%. However, it is found that the LED head of the comparative example can not be controlled to cause the LED elements to emit constant amount of lights.

When the image formed by the color LED printer using the lens array 50 of the first embodiment of the present invention is evaluated, streaks, stripes or the like are not observed. In contrast, when the image formed by the printer using the lens array 50' of the comparative example is evaluated, stripes occur with a cycle of 1.6 mm corresponding to the arrangement interval P of the micro lenses 53'.

Figure 15:
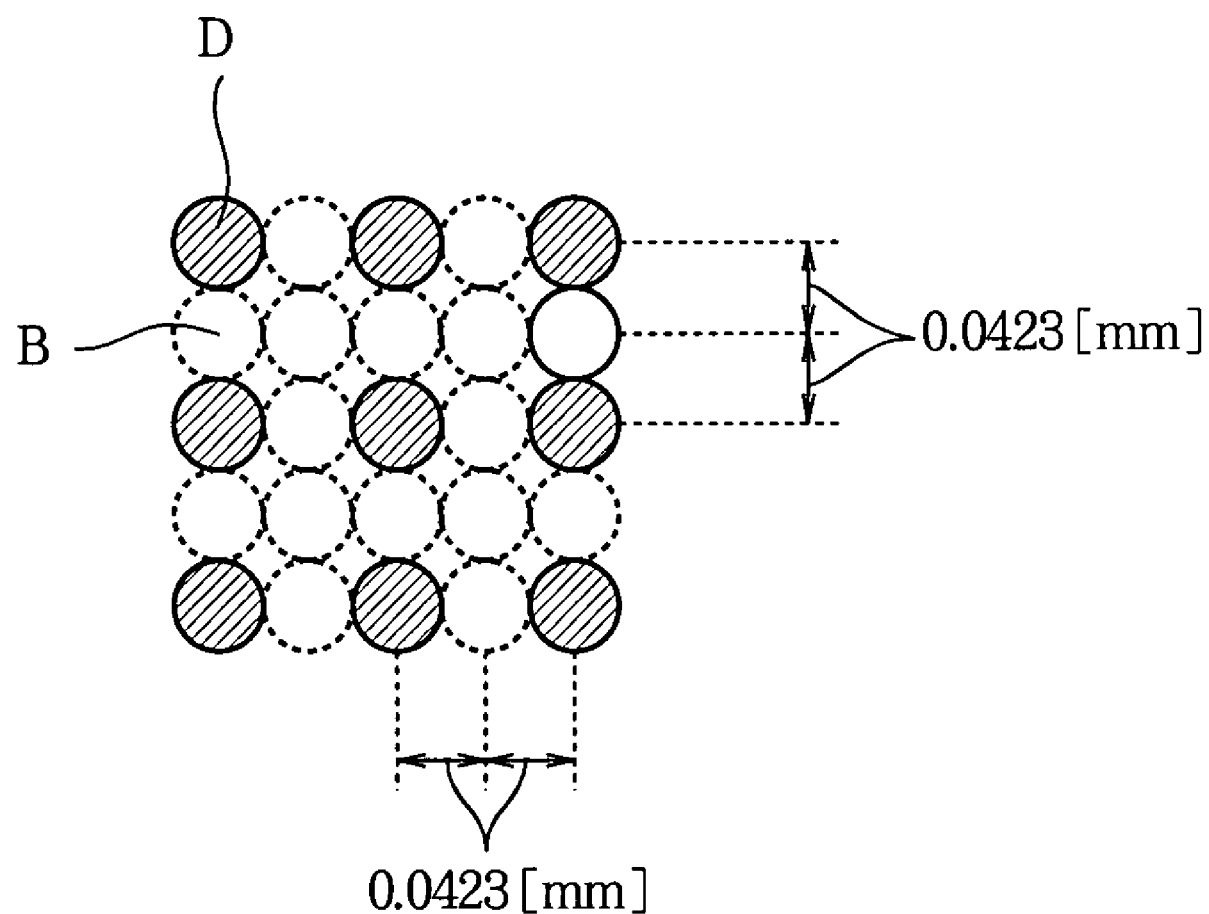
FIG. 15 shows "1×1" image used in the experiment in the first embodiment of the present invention.

In this regard, on the evaluation of the image formed by the printer, "1×1" image of 600 dpi is formed on the sheet, and the degradation of the image quality is evaluated. As shown in FIG. 15, the "1×1" image is an image in which dots D are alternately formed at 300 dpi (i.e., at the interval of 0.0423 mm×2) in the vertical and horizontal directions on the dot matrix of 600 dpi. In FIG. 15, the mark B indicates a blank space between the dots D.

As described above, in the first embodiment of the present invention, it becomes possible to prevent the degradation of the resolution and the reduction of the amount of light (that otherwise occur with a cycle corresponding to the arrangement interval P of the micro lenses 53 of the lens array 50).

Further, the printer 10 according to the first embodiment of the present invention, it becomes possible to form an image having neither of streaks, stripes or the like on the sheet in accordance with an image data.

In this embodiment, the micro lenses 53 are disposed on both sides of the light-blocking portion 54. However, it is also possible to dispose compound lenses (each of which includes a plurality of micro lenses disposed in an overlapping manner) on each side of the light-blocking portion 54.

Second Embodiment

Next, the second embodiment of the present invention will be described. In the second embodiment of the present invention, compound lenses are disposed on each side of the light-blocking portion. The components having the same structures as those of the first embodiment are assigned the same reference numerals. Regarding the advantages obtained by the same structures, the description in the first embodiment is incorporated herein.

Figure 16:
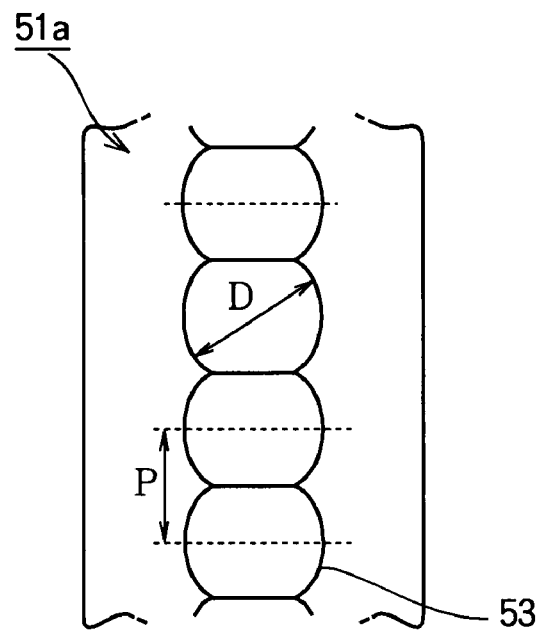
FIG. 16 is a plan view showing a lens array according to the second embodiment of the present invention.
Figure 17:
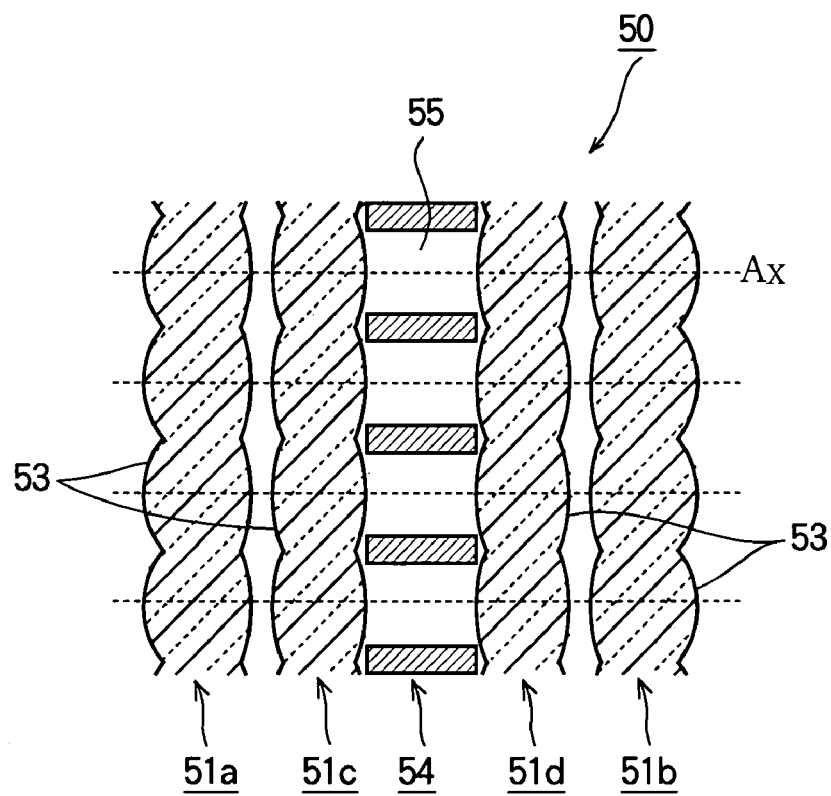
FIG. 17 is a longitudinal sectional view showing the lens array according to the second embodiment of the present invention.
Figure 18:
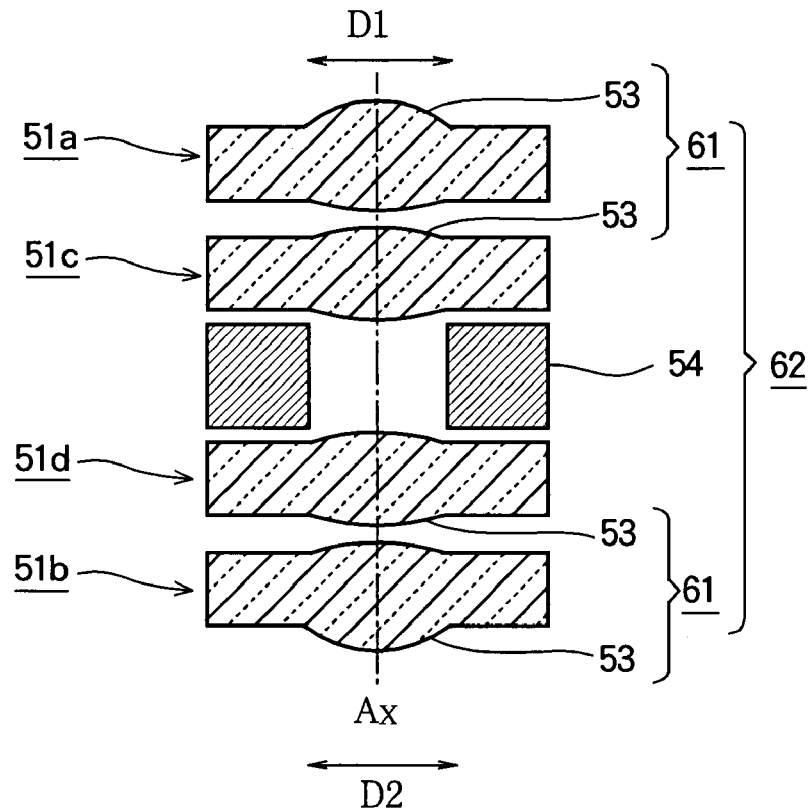
FIG. 18 is a cross sectional view showing the lens array according to the second embodiment of the present invention.

FIG. 16 is a plan view of a lens array according to the second embodiment of the present invention. FIGS. 17 and 18 are a longitudinal sectional view and a cross sectional view of the lens array according to the second embodiment of the present invention.

As shown in FIGS. 17 and 18, the lens array 50 includes four lens plates 51a, 51b, 51c and 51d and a light-blocking portion 54 having a plurality of openings 55. The lens plates 51a and 51c are overlapped with each other in the direction of the optical axes Ax, and the lens plates 51b and 51d are overlapped with each other in the direction of the optical axes Ax. The light-blocking portion 54 is disposed between the light-blocking portions 51c and 51d.

A plurality of micro lenses 53 are arranged on predetermined positions of the lens plates 51a through 51d (in this example, on the center portions of each of the lens plates 51a through 51d in the width direction). On each of the lens plates 51a through 51d, the micro lenses 53 are linearly arranged in the direction perpendicular to the optical axes Ax, i.e., in the longitudinal direction of the lens plates 51a through 51d.

As shown in FIG. 18, each of the micro lenses 53 of the lens plate 51a and the corresponding one of the micro lenses 53 of the lens plate 51b constitute a compound lens 61. Each of the micro lenses 53 of the lens plates 51b and the corresponding one of the micro lenses 51d constitute a compound lens 61. The compound lenses 61 constitute a lens-pair (i.e., a lens group) 62.

In the second embodiment, the largest diameter D1 of each of the micro lenses 53 of the lens plates 51a and 51c, the largest diameter D2 of each of the micro lenses 53 of the lens plates 51b and 51d and the arrangement interval P of the micro lenses 53 satisfy:

D1=D2, and

P<D1(=D2).

In an alternative arrangement, the diameters D1 and D2 are not same as each other. In this case, the diameters D1 and D2 and the arrangement interval P satisfy:

P<D1, and

P<D2.

Third Embodiment

Next, the third embodiment of the present invention will be described. The components having the same structures as those of the first or second embodiment are assigned the same reference numerals. Regarding the advantages obtained by the same structures, the description in the first or second embodiment is incorporated herein.

Figure 19:
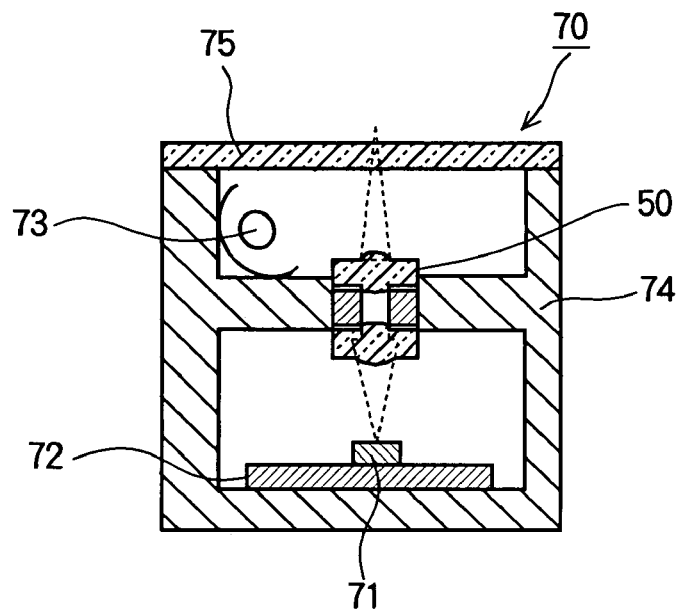
FIG. 19 is a cross sectional view showing a reading apparatus according to the third embodiment of the present invention.

FIG. 19 is a cross sectional view showing a reading apparatus according to the third embodiment of the present invention.

The reading apparatus 70 is configured to read a manuscript (not shown) and to generate electronic data. The reading apparatus 70 includes the lens array 50 (as an optical system) for forming a focused image of the manuscript at a predetermined position, light receiving elements 71 that receive the focused image and convert the focused image into electric signal, a wiring board 72 on which the light receiving elements 71 and a not shown control unit (adjacent to the light receiving elements 71) are disposed, a light source 73 that emits light to the manuscript, a manuscript table 75 made of material that transmits the light (emitted by the light source 73) on which the manuscript is placed, and the like. The reference numeral 74 indicates a holding member that holds respective components of the reading apparatus 70.

Figure 20:
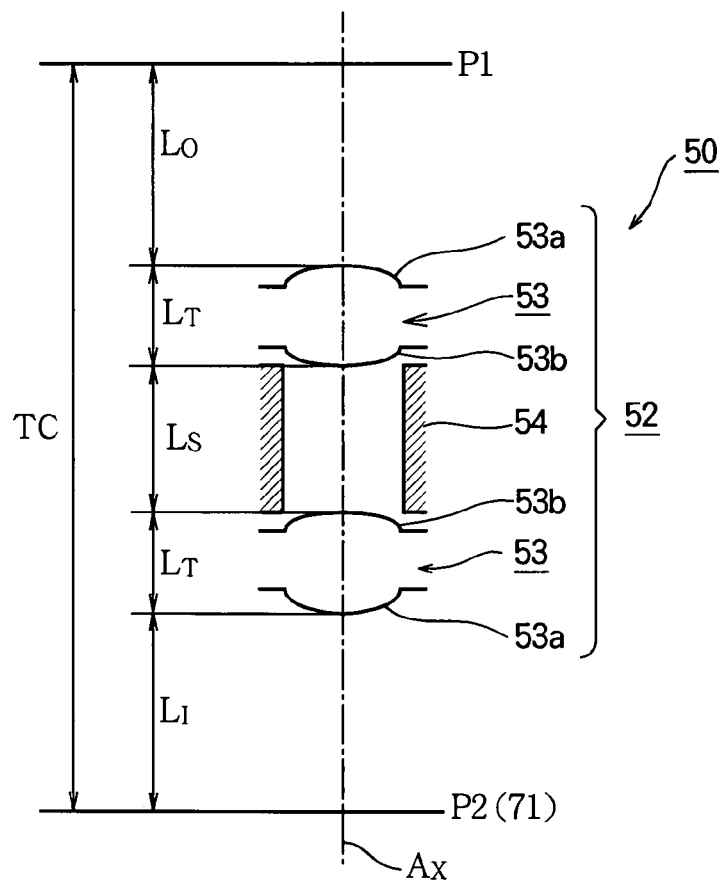
FIG. 20 shows an arrangement of optical elements of the lens array according to the third embodiment of the present invention.

FIG. 20 is a schematic view showing an arrangement of optical elements of the reading apparatus according to the third embodiment.

As shown in FIG. 20, the mark $L_O$ indicates the distance between the lens array 50 and the manuscript (i.e., the distance between an object plane and a lens surface), and is defined by the distance between the apex of the outer curved surface 53a of the lens array 50 and a plane (i.e., an object plane P1) on which the manuscript is placed. The mark $L_I$ indicates the distance between the lens array 50 and the light receiving elements 71 (i.e., the distance between an image plane and a lens surface), and is defined by the distance between the apex of the outer curved surface 53a of the micro lens 53 and a plane (i.e., an image plane P2) on which the light receiving elements 71 are arranged. The mark $L_T$ indicates the lens thickness, and is defined by the distance between the outer curved surface 53a and the inner curved surface 53b of the micro lens 53. The mark $L_S$ indicates the lens surface distance, and is defined by the distance between the respective inner curved surfaces 53b of the micro lenses 53 of the lens-pair 52. The mark TC indicates the distance between the image plane P2 and the object plane P1, and is defined by distance between the manuscript and the light receiving portion 71.

The reading apparatus 70 of the third embodiment uses the lens array 50, and the reading apparatus of the comparative example uses the lens array 50' (FIGS. 9 and 10). The configurations of the lens array 50 and the lens array 50' are the same as those shown in TABLE 1 described in the first embodiment.

The operation of the reading apparatus 70 of the third embodiment will be described.

The light emitted by the light source 73 is reflected by the surface of the manuscript placed on the manuscript table 75. The lens array 50 focuses a part of the light reflected by the manuscript, and forms a focused image on a surface of the light receiving elements 71. The light receiving elements 71 transfer the focused image into the electric signal. The electric signal is sent to the not shown control unit of the reading apparatus 70, and an image data is generated at an image forming portion of the control unit.

A description will be made as to the experiments. The image data is generated from the same manuscript using the reading apparatus 70 of the third embodiment, and using the reading apparatus of the comparative example. When the reading apparatus 70 of the third embodiment is used, it is found that the image data similar to the manuscript can be obtained. In contrast, when the reading apparatus of the comparative example is used, it is found that stripes occur with a cycle of 1.6 mm which is the same as the arrangement interval P of the micro lenses 53.

On the experiments using the reading apparatus 70 of the third embodiment and the reading apparatus of the comparative example, the medium with "1×1" image of 600 dpi (as shown in FIG. 15) is used as the manuscript.

As described above, according to the third embodiment of the present invention, it becomes possible to prevent the degradation of the resolution and the reduction of the amount of light (that otherwise occur with a cycle corresponding to the arrangement interval P of the micro lenses 53 of the reading apparatus 70). Therefore, it becomes possible to prevent the generation of the streaks, stripes or the like on the image data. Accordingly, the image quality can be enhanced, and the image data similar to the manuscript can be obtained.

Fourth Embodiment

Figure 21:
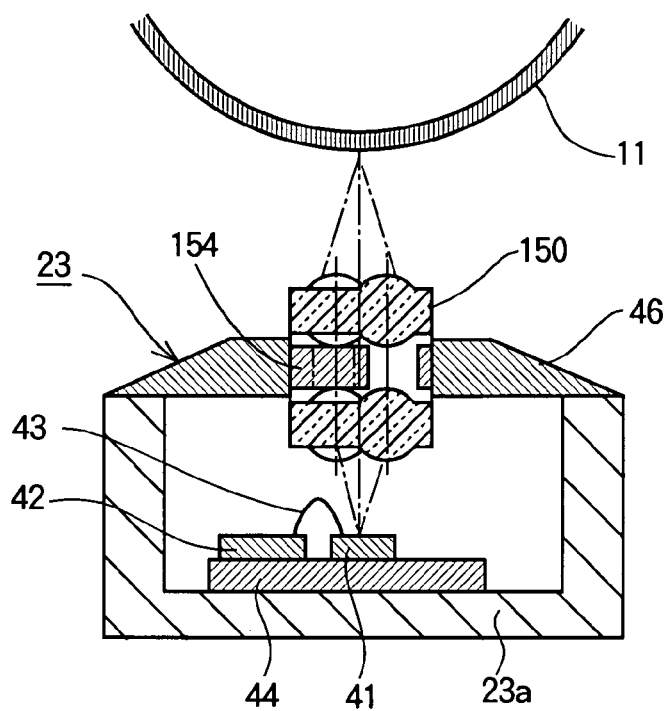
FIG. 21 is a cross sectional view of an LED head according to the fourth embodiment of the present invention.

FIG. 21 is a cross sectional view of an LED head according to the fourth embodiment of the present invention.

As shown in FIG. 21, the LED head 23 includes a lens array 150. The lens array 150 is fixed to a supporting body 23a by means of a holding member 46.

Further, the LED head 23 includes light emitting portions 41 that emit lights to the photosensitive drum 11. The light emitting portions 41 include a plurality of LED elements (i.e., light emitting elements) linearly arranged. In this example, the number of the LED elements per inch (approximately 25.4 mm) is 1200. A light-blocking portion (not shown) is disposed between the light emitting portions 41 and the lens array 150.

The light emitting portions 41 and a driver IC 42 for controlling the light emission of the LED elements of the light emitting portions 41 are provided on a wiring substrate 44

(disposed on the supporting body 23a). The light emitting portions 41 and the driver IC 42 are connected with each other by means of wires 43.

Next, the operation of the above described LED head 23 will be described.

First, the above described control unit generates control signal for the LED head 23 in accordance with the image data, and sends the control signal to the driver IC 42. The driver IC 42 causes the LED elements of the light emitting portions 41 to respectively emit lights of predetermined amounts according to the control signal. Then, the lights emitted by the respective LED elements are incident on the lens array 150, pass through the lens array 150 and are focused on the photosensitive drum 11, so that the focused images of the light emitting portion 41 are formed on the photosensitive drum 11.

The lens array 150 will be described.

Figure 22:
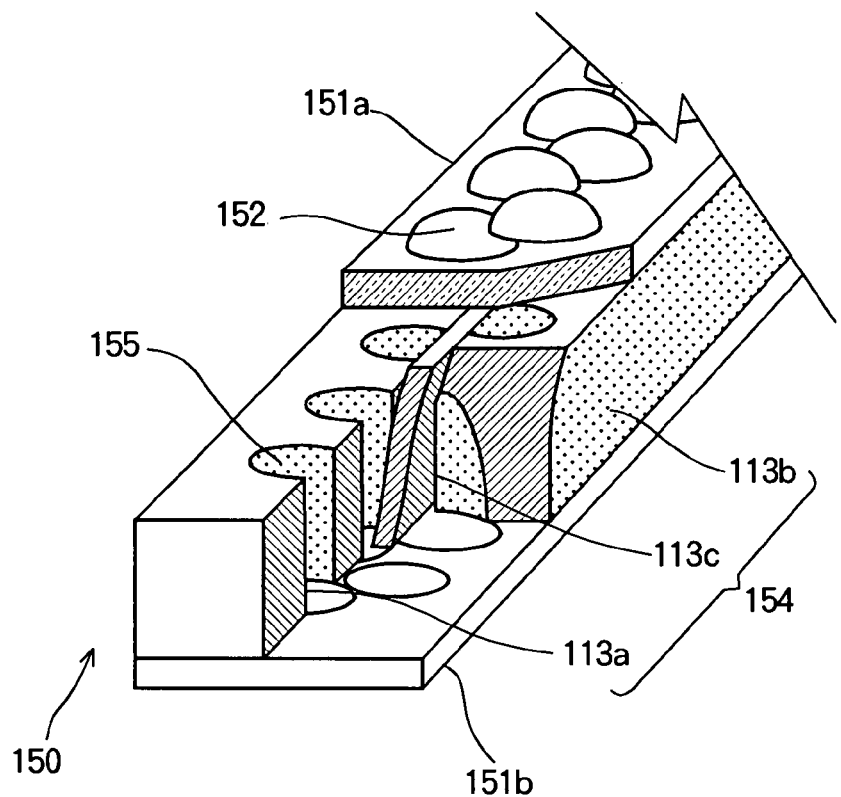
FIG. 22 is a perspective view of a lens array according to the fourth embodiment of the present invention.
Figure 23:
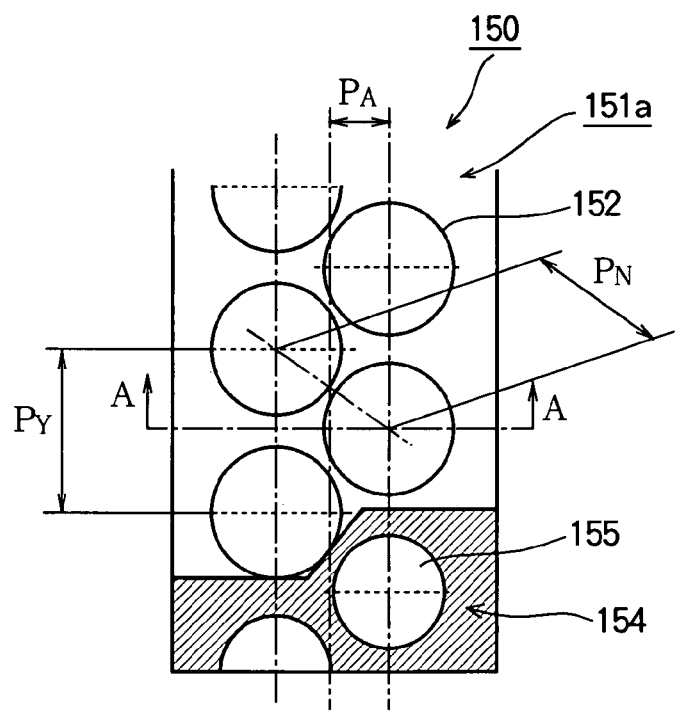
FIG. 23 is a partially cutaway plan view of the lens array according to the fourth embodiment of the present invention.
Figure 24:
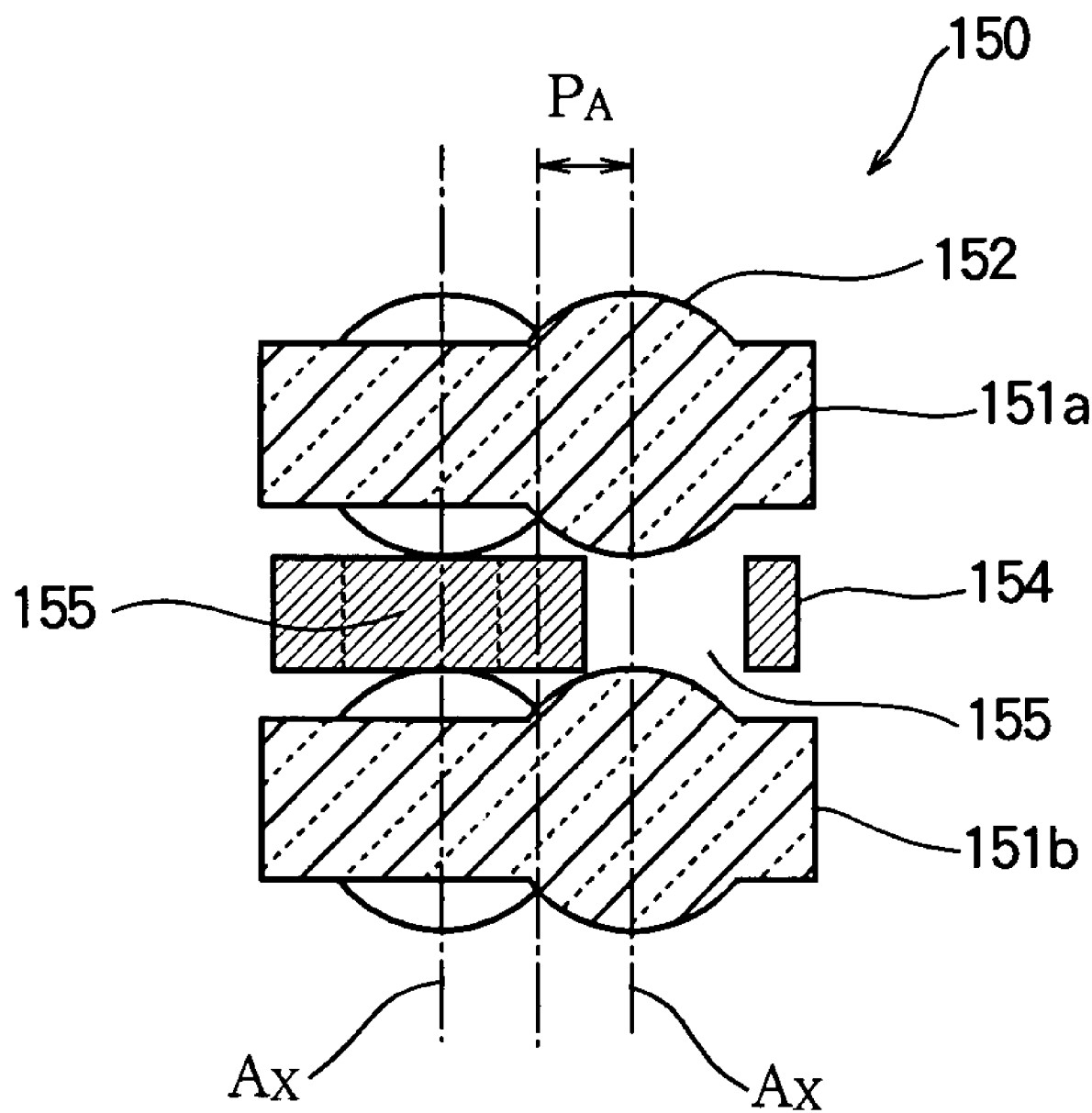
FIG. 24 is a cross sectional view of the lens array according to the fourth embodiment of the present invention.

FIGS. 22 and 23 are a perspective view and a partially cutaway plan view of the lens array 150 according to the fourth embodiment of the present invention. FIG. 24 is a cross sectional view of the lens array 150.

As shown in FIGS. 22 and 24, the lens array 150 includes two lens plates 151a and 151b arranged in two stages so that the lens plates 151a and 151b face each other. Each of the lens plates 151a and 151b includes a plurality of micro lenses 152 having a predetermined curved surfaces. The lens array further includes a light-blocking portion 154 made of light-blocking material and disposed between the lens plates 151a and 151b. The light-blocking portion 154 has openings 155 corresponding to the micro lenses 152. The light-blocking portion 154 shields each pair of micro lenses 152 (facing each other) from the light having passed through any of other pairs of the micro lenses.

As shown in FIG. 23, the micro lenses 152 on each of the lens plates 151a and 151b are arranged in at least two rows (in this example, two rows) and arranged in a staggered manner. In FIG. 23, the arrangement interval $P_Y$ indicates the interval of the micro lenses 152 in the arranging direction (i.e., the direction in which the micro lenses 152 are arranged in each row). Further, the arrangement interval $P_N$ indicates the interval (center-to-center distance) between the closest two micro lenses 152 across the rows.

In the lens array 150 of the fourth embodiment including a plurality of micro lenses 152 arranged in at least two rows, the arrangement interval $P_N$ (i.e., the interval between the closest two micro lenses 152 across the rows) is smaller than the arrangement interval $P_Y$ of the micro lenses 152 in the arranging direction. Since the arrangement interval $P_N$ is small, the resolution can be enhanced, and the amount of light can be increased.

Further, as shown in FIG. 24, each of the micro lenses 152 of the lens plate 151a and the corresponding one of the micro lenses 152 of the lens plate 151b are arranged in two stages so that the optical axes thereof are aligned with each other, and constitute a lens-pair (i.e., a lens group).

As shown in FIG. 22, the light-blocking portion 154 includes comb-like members 113a and 113b facing each other in the width direction of the lens plates 151a and 151b, and a partition plate 113 disposed between the comb-like members 113a and 113b. The above described openings 155 are formed on the comb-like members 113a and 113b.

The micro lenses 152 of the lens plates 151a and 151b and the openings 155 of the light-blocking portion 154 are arranged at the same arrangement interval in the same direction (i.e., in the longitudinal direction of the lens plates 151a and 151b). The optical axes of the micro lenses 152 of the lens plates 151a and 151b are aligned with the centers of the openings 55. Each of the micro lenses 152 is configured to form an inverted image. The lens-pair (i.e., a pair of micro lenses 152 facing each other) is configured to form an erected image.

The arrangement interval of the micro lenses 152 of the lens plates 151a and 151b and the openings 155 of the light-blocking portion 154 is referred to as an arrangement interval $P_Y$ (FIG. 23). The interval (i.e., center-to-center distance) between the closest micro lenses 152 is referred to as an arrangement interval $P_N$. The arrangement intervals $P_Y$ and $P_N$ satisfy the relationship:

$$P_Y > P_N$$

Further, the distance between the center line of each row of the micro lenses 152 and the center line of the lens plate 151a (151b) in the width direction is referred to as a row-center-to-array-center distance $P_A$ (FIG. 23). The row-center-to-array-center distance $P_A$ is expressed as the following equation (3):

$$P_A = \sqrt{\left(\frac{P_N}{2}\right)^2 - \left(\frac{P_Y}{4}\right)^2} \tag{3}$$

The lens array 150 of the specific example of the fourth embodiment is prepared for the verification of an advantage of the fourth embodiment. In the specific example, the arrangement interval $P_Y$ is 1.200 mm and the arrangement interval $P_N$ is 1.000 mm. In this case, the row-center-to-array-center distance $P_A$ is 0.400 mm according to the above described equation (3).

In contrast, the lens array of comparative example (i.e., the lens array 150' shown in FIG. 27) is prepared for the comparison with the specific example of the fourth embodiment. In the comparative example, the arrangement interval $P_Y$ is 1.200 mm, and the arrangement interval $P_N$ is 1.200 mm. In this case, the row-center-to-array-center distance $P_A$ is 0.520 mm according to the above described equation (3).

The lens array 150 of the specific example of the fourth embodiment and the lens array 150' of the comparative example are different in the positional relationship between the micro lenses 152 and the light emitting portions 41 (FIG. 21). Therefore, the optimum shape of the curved surface of the micro lens 152 of the lens array 150 of the fourth embodiment is different from that of the lens array 150' of the comparative example.

In the lens array 150 of the specific example of the fourth embodiment and the lens array 150' of the comparative example, the lens plates 51a and 51b are formed of cycloolefin-based resin "ZEONEX E48R" (product name) manufactured by Nihon Zeon Corporation. The micro lenses 152 are integrally formed with the respective lens plates 151a and 151b by resin molding.

In the lens array 150 of the specific example of the fourth embodiment and the lens array 150' of the comparative example, the light-blocking portion 154 (the comb-like members 113a and 113b) is formed of stainless plates, and the openings 55 are formed by etching. A non-reflection coating layer composed of chrome is formed on the surface of the light-blocking portion 154.

Figure 25:
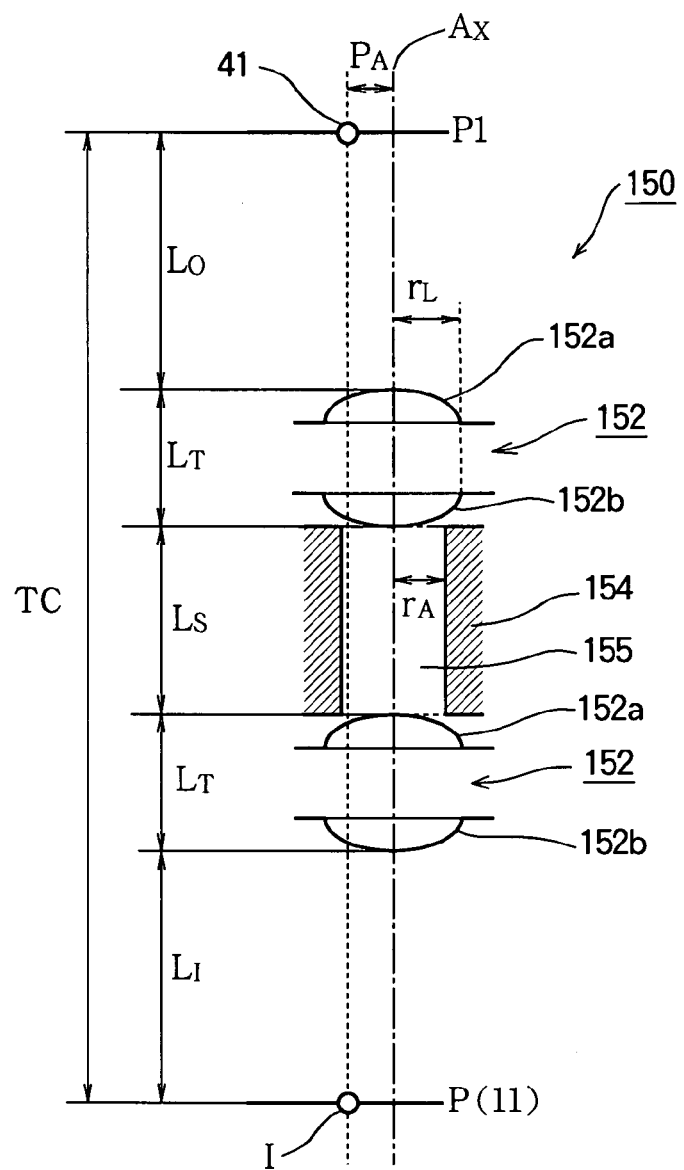
FIG. 25 shows an arrangement of optical elements of the lens array according to the fourth embodiment of the present invention.

FIG. 25 shows a arrangement of optical elements of the lens array 150 according to the fourth embodiment of the present invention.

As shown in FIG. 25, the mark $L_O$ indicates the distance between the lens array 150 and the light emitting portion 41 (i.e., the distance between an object plane and a lens surface), and is defined by the distance between the apex of the outer curved surface 152a of the micro lens 152 and a plane (i.e., an object plane P1) on which the light emitting portions 41 are arranged. The mark $L_I$ indicates the distance between the lens array 150 and the photosensitive drum 11 (i.e., the distance between an image plane and a lens surface), and is defined by the distance between the apex of the outer curved surface 152a of the micro lens 152 and a plane (i.e., an image plane P2) on which the photosensitive drum 11 is disposed. The mark $L_T$ indicates the lens thickness, and is defined by the distance between the outer curved surface 152a and the inner curved surface 152b of the micro lens 152. The mark $L_S$ indicates the distance between lens surfaces, and is defined by the distance between the respective inner curved surfaces 152b of the micro lenses 152. The mark TC indicates the distance between the image plane P2 and the object plane P1, and is defined by distance between the photosensitive drum 11 and the light emitting portion 41. The mark $r_L$ indicates the radius of the micro lens 152, and the mark $r_A$ indicates the radius of the opening 155 (i.e., the opening dimension of the light-blocking portion 154).

Further, the outer curved surface 152a and the inner curved surface 152b of the micro lens 152 are respectively rotationally-symmetric high-order aspheric surfaces, and are respectively expressed as the following equations (4) and (5):

$$Z_0(r) = \frac{\frac{r^2}{C_0}}{1 + \sqrt{1 - \left(\frac{r}{C_0}\right)^2}} + A_0 \cdot r^4 + B_0 \cdot r^6. \quad (4)$$

$$Z_1(r) = \frac{\frac{r^2}{C_1}}{1 + \sqrt{1 - \left(\frac{r}{C_1}\right)^2}} + A_1 \cdot r^4 + B_1 \cdot r^6. \quad (5)$$

The above described rotationally-symmetric high-order aspheric surface is a curved surface having the same shape in every radial direction about the optical axis of the micro lens 152 (i.e., rotationally-symmetric shape) and having a plurality of inflection points. Each of the functions $Z_O(r)$ and $Z_I(r)$ indicates a rotating coordinate system whose axis is parallel to the optical axis of the micro lens 152 and in which the radial coordinate is expressed as "r". The apexes of the outer curved surface 152a and the inner curved surface 152b of the micro lens 152 are defined as original points. The direction from the object plane toward the image plane is expressed as being positive number.

In this regard, the mark $C_O$ indicates a radius of curvature of the outer curved surface 152a. The mark $A_O$ indicates a fourth-order aspherical coefficient of the outer curved surface 152a. The mark $B_O$ indicates a sixth-order aspherical coefficient of the outer curved surface 152a. The mark $C_I$ indicates a radius of curvature of the inner curved surface 152b. The mark $A_I$ indicates a fourth-order aspherical coefficient of the inner curved surface 152b. The mark $B_I$ indicates a sixth-order aspherical coefficient of the inner curved surface 152b.

Although the micro lenses 152 are integrally formed with the lens plates 151a and 151b in this embodiment, it is also possible to individually form the micro lenses 152 and to fix the micro lenses 152 to the lens plates 151a and 151b at predetermined intervals.

Although the outer curved surface 152a and the inner curved surface 152b have rotationally-symmetric high-order aspheric surfaces in this embodiment, the outer curved surface 152a and the inner curved surface 152b can be spherical surfaces. Moreover, the outer curved surface 152a and the inner curved surface 152b can be conic surfaces (such as paraboloidal surfaces, ellipsoidal surfaces, hyperboloidal surfaces or the like), toroidal surfaces (asymmetric in the respective directions perpendicular to the optical axis) and cylindrical surfaces or the like. Further, the outer curved surface 152a and the inner curved surface 152b can be conventional free curved surfaces.

In this embodiment, since the outer and inner curved surfaces 152a and 152b are formed as aspherical surfaces, the aberration can be smaller than the micro lens having spherical surfaces, and therefore the resolution can be enhanced. Further, since the outer and inner curved surfaces 152a and 152b are formed to be rotationally-symmetric, the structure of the micro lens 152 can be simpler than the micro lens having asymmetrical surfaces.

Although the micro lens 152 of this embodiment is composed of as a single lens having two refracting surfaces (curved surfaces), it is also possible to use a compound lens (i.e., a combination of a plurality of single lenses) having four or more refracting surfaces.

The micro lens 152 is formed of a transparent material (transmitting the light from the light source) having a uniform refractive index and having predetermined curved surfaces. However, it is also possible to use a lens, optical fibers or the like having a predetermined distribution of the refractive index.

Further, although the light-blocking portion 154 is formed of stainless steel plate, it is also possible to form a light-blocking pattern of a light-blocking material (that blocks the light emitted by the light source) on a material that transmits the light. It is also possible to form the light-blocking pattern of the light-blocking material partially on the lens plates 151a and 151b. It is also possible to partially roughen the surfaces of the lens plates 151a and 151b to block the light. It is also possible to partially cut down the lens plates 151a and 151b to prevent the incidence of a part of the light.

In this embodiment, the LED elements (the LED array) are used as the light emitting portions 41. However, it is also possible to use organic EL elements as the light emitting portions 41. Further, it is also possible to use semiconductor lasers as the recording head of the printer 10. It is also possible to use a light source such as a fluorescent lamp, halogen lamp or the like together with a shutter composed of a liquid crystal display.

Although the lens array 150 of this embodiment includes two rows of micro lenses 152, the lens array 150 can have three or more rows of micro lenses 152.

The operation of the above described LED head 23 will be described.

Figure 26:
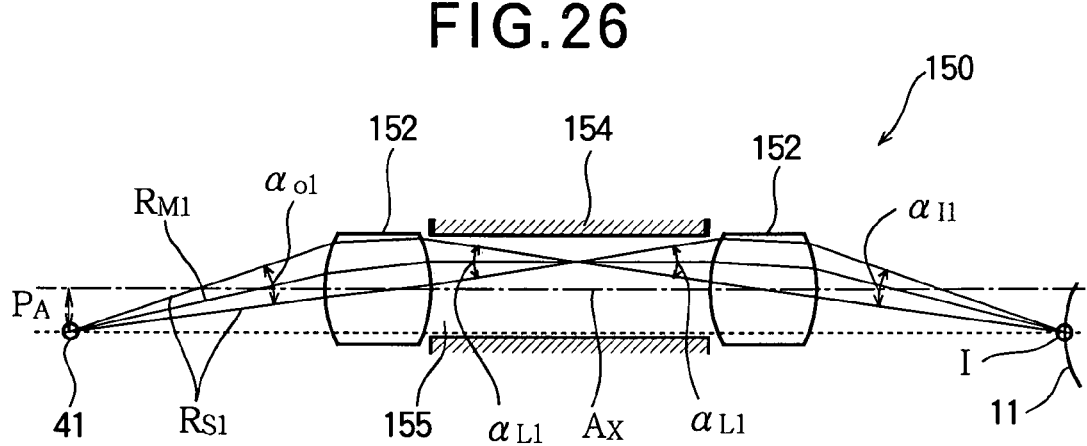
FIG. 26 shows an optical system of the LED head according to the fourth embodiment of the present invention.
Figure 27:
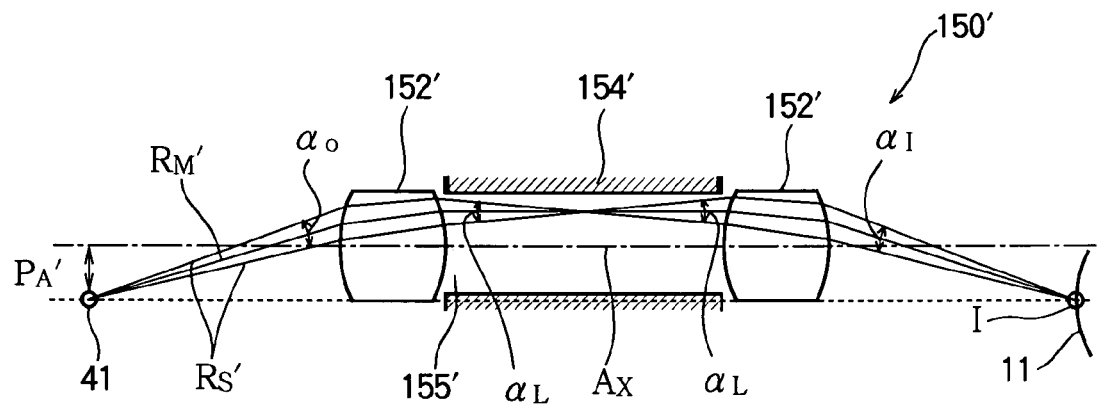
FIG. 27 shows an optical system of an LED head according to the comparative example.

FIG. 26 shows an optical system of the LED head according to the fourth embodiment of the present invention. FIG. 27 shows an optical system of the LED head according to the comparative example.

In FIGS. 26 and 27, a light path between the light emitting portion 41 and an image I focused by the lens array 150 (150') is shown. Further, only one LED element of the light emitting portion 41, two micro lenses 152 of the lens array 150 (150'), the light-blocking portion 154 and the photosensitive drum 11 are shown in FIGS. 26 and 27. The horizontal (left-to-right) direction in FIGS. 26 and 27 is the direction of the optical axis between the light emitting portion 41 and the focused image on the photosensitive drum 11. The micro lenses 152 and the LED elements are arranged in the direction perpendicular to the sheets of FIGS. 26 and 27. Among the micro lenses 152 and the openings 155 of the light-blocking portion 154, only one pair of micro lenses 152 and one opening 55 aligned with each other in the direction of the optical axis are shown in FIGS. 26 and 27. Although not shown in FIGS. 26 and 27, the micro lenses 152 of the second row and the corresponding openings 155 of the light-blocking portion 154 are disposed below the micro lenses 152 of the first row and the corresponding openings 155 in a vertically symmetrical manner in FIGS. 26 and 27.

As shown in FIG. 26, a light ray traveling along the shortest path of the lens array 150 of the fourth embodiment is defined as a principal ray $R_{M1}$, and a light ray travelling along the outermost path of the lens array 150 is defined as a rim ray $R_{S1}$. As shown in FIG. 27, a light ray traveling along the shortest path of the light path of the lens array 150' of the comparative example is defined as a principal ray $R_M'$, and a light ray travelling along the outermost path of the lens array 150 is defined as a rim ray $R_S'$.

The angular angle of the light emitted by the light emitting portion 41 of the specific example of the fourth embodiment is referred to as an angular angle $\alpha_{O1}$, and the angular angle of the light emitted by the light emitting portion 41 of the comparative example is referred to as an angular angle $\alpha_O$. The angular angle of the light incident on the photosensitive drum 11 of the specific example of the fourth embodiment is referred to as an angular angle $\alpha_{I1}$, and the angular angle of the light incident on the photosensitive drum 11 of the comparative example is referred to as an angular angle $\alpha_I$. The angular angle of the light emitted by and incident on the respective micro lenses 152 of the specific example of the fourth embodiment is referred to as an angular angle $\alpha_{L1}$, and the angular angle of the light emitted by and incident on the respective micro lenses 152 of the comparative example is referred to as an angular angle $\alpha_L$.

The angular angles $\alpha_{O1}$, $\alpha_{I1}$ and $\alpha_{L1}$ of the lens array 150 of the specific example of the fourth embodiment are greater than the angular angles $\alpha_{O2}$, $\alpha_{I2}$ and $\alpha_{L2}$ of the comparative example. This means that the focused image of the light emitting portion 41 focused by the lens array 150 of the forth embodiment is brighter than the image focused by the lens array 150' of the comparative example.

In the lens array 150 having two rows of the micro lenses 152, the center line of the lens array 150 in the width direction is positioned on a line connecting the light emitting portion 41 and the focused image I focused by the lens array 150. The distance between the center line and the optical axis of the micro lens 152 is the above described row-center-to-array-center distance $P_A$. The row-center-to-array-center distance $P_A$ of the lens array of the specific example of the fourth embodiment is 0.400 mm, and the row-center-to-array-center distance $P_A$ of the lens array 150' of the comparative example is 0.520 mm.

Generally, when an image of an object is focused using the lens, the aberration becomes smaller and the amount of light increases, as the object is closer to the optical axis of the lens.

In the lens array 150 of the specific example of the fourth embodiment, the optical axes of the micro lenses 152 are closer to the light emitting portions 41 compared with the lens array 150' of the comparative example. Therefore, it becomes possible to obtain a sharp focused image exhibiting small aberration, and it becomes possible to increase the resolution of the focused image and the amount of light.

The lens array 150 of the specific example of the fourth embodiment and the lens array 150' of the comparative example are configured as shown in TABLE 2.

TABLE 2

| MARK | PROPERTIES | EXAMPLE OF 4TH EMBODIMENT | COMPARATIVE EXAMPLE |
|---|---|---|---|
| $P_Y$ | ARRANGEMENT INTERVAL OF MICRO LENSES IN ARRANGING DIRECTION(mm) | 1.200 | 1.200 |
| $P_N$ | ARRANGEMENT INTERVAL BETWEEN CLOSEST MICRO LENSES(mm) | 1.000 | 1.200 |
| $P_A$ | ROW-CENTER-TO-ARRAY-CENTER DISTANCE (mm) | 0.400 | 0.520 |
| $L_O$ | DISTANCE BETWEEN OBJECT PLANE AND LENS SURFACE (mm) | 2.300 | 2.300 |
| $r_L$ | RADIUS OF MICRO LENS (mm) | 0.500 | 0.500 |
| $C_O$ | RADIUS OF CURVATURE OF OUTER CURVED SURFACE (mm) | 0.8645 | 0.5833 |
| $A_O$ | 4TH ORDER ASPHERICAL COEFFICIENT OF OUTER CURVED SURFACE | −0.3845 | −0.3904 |
| $B_O$ | 6TH ORDER ASPHERICAL COEFFICIENT OF OUTER CURVED SURFACE | −0.2100 | −0.1618 |
| $C_I$ | RADIUS OF CURVATURE OF INNER CURVED SURFACE (mm) | −0.8908 | −0.8936 |
| $A_I$ | 4TH ORDER ASPHERICAL COEFFICIENT OF INNER CURVED SURFACE | 0.4542 | 0.4474 |
| $B_I$ | 6TH ORDER ASPHERICAL COEFFICIENT OF INNER CURVED SURFACE | −0.0753 | −0.0398 |
| $L_T$ | LENS THICKNESS (mm) | 1.000 | 1.000 |
| $L_S$ | DISTANCE BETWEEN LENS SURFACES (mm) | 2.540 | 2.520 |
| $r_A$ | OPENING DIMENSION OF LIGHT BLOCKING PORTION (mm) | 0.450 | 0.450 |
| $L_I$ | DISTANCE BETWEEN IMAGE PLANE AND LENS SURFACE (mm) | 2.300 | 2.300 |
| TC | DISTANCE BETWEEN IMAGE PLANE AND OBJECT PLANE (mm) | 9.140 | 9.120 |
| MTF | MTF at 1200 dpi (%) | 91 | 91 |
| $I_r$ | AMOUNT OF LIGHT RELATIVE TO COMPARATIVE EXAMPLE (times) | 2.2 | 1.0 |

TABLE 2 shows the MTF at the resolution of 1200 dpi, and the amount of light ($I_r$) expressed as a relative value relative to the comparative example.

The MTF (Modulation Transfer Function, i.e., amplitude transfer function) will be described.

Figure 28:
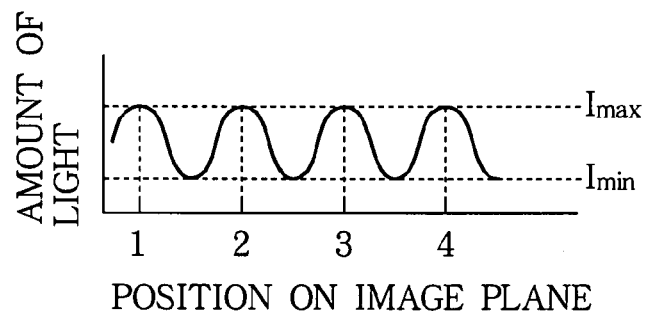
FIG. 28 shows the distribution of amount of light according to the fourth embodiment of the present invention.

FIG. 28 is a graph showing the distribution of the amount of light according to the fourth embodiment of the present invention. The horizontal axis indicates the position on the image plane, and the vertical axis indicates the amount of light. Along the horizontal axis, numerals 1, 2, 3 and 4 indicate positions corresponding to the light emitting portions 41 that are activated.

The MTF indicates a resolution of the focused image focused by the LED head 23 (FIG. 21), i.e., a contrast in the amount of light forming the focused images of activated LED elements of the LED head 23. When the highest contrast in the amount of light of the focused image is obtained and when the highest resolution of the LED head 23 is obtained, the MTF is defined to be 100%. As the MTF becomes smaller, the contrast in the amount of light of the focused image decreases, and the resolution as the LED head 23 decreases.

Referring to FIG. 28, the above described MTF (%) is defined as follows:

$$MTF=((I_{max}-I_{min})/(I_{max}+I_{min}))\times 100(\%)$$

where $I_{max}$ is a maximum of the amount of light forming the focused image, and $I_{min}$ is a minimum of the amount of light between the focused images adjacent to each other.

On the measurement of the MTF and the amount of light, a microscopic digital camera is used to take the focused image at a position distanced from the end surface of the lens array 150 on the image plane side (the photosensitive drum 11 side) by the distance $L_f$. Based on the image taken by the microscopic digital camera, the distribution of the amount of light forming the focused image of the light emitting portion 41 is analyzed, and the MTF and the amount of light are calculated.

For this purpose, the lens array 150 of the specific example of the fourth embodiment (and the lens array 150' of the comparative example) is mounted on the LED head 23 of the color LED printer having the resolution of 1200 dpi. In the LED head 23, the LED elements arranged at 1200 dpi (i.e, 1200 LED elements are arranged per approximately 25.4 mm) are alternately activated, and the maximum amount $I_{max}$ and the minimum amount $I_{min}$ of light are measured. Based on the measured amounts $I_{max}$ and $I_{min}$, the MTF is calculated. The measurement of the amount of light is performed while all of the LED elements of the LED head 23 are activated, and the amount of light is determined as an average of the amounts of lights emitted by the respective LED elements.

The amount of light is expressed as a proportion to that of the comparative example. As shown in TABLE 2, when the lens array 150 of the specific example of the fourth embodiment is used, the amount of light becomes 2.2 times the amount of light when the lens array 150' of the comparative example is used, and the amount of light is found to be sufficient for the LED head 23 of a printer. Further, when the lens array 150 of the specific example of the fourth embodiment is used, the MTF is 91% (i.e., a sufficient value), i.e., not lower than that when the lens array 150' of the comparative example is used. This is because, in the specific example of the fourth embodiment, the row-center-to-array-center distance $P_A$ is small, and therefore the resolution is high and the amount of light is large. In this regard, the aspherical shape of the micro lens 152 of the specific example of the fourth embodiment is different from that of comparative example. This is because the relationship between the micro lens 152 and the light emitting portion 141 in the specific example of the fourth embodiment is different from that of the comparative example, since the distance $P_A$ is reduced.

As a result of accumulated evaluations using the color LED printer, it has been clear that there is no degradation of the quality of the image formed on the sheet such as a density unevenness (appearing in a high-density region), stripes, roughness or the like, when the MTF is greater than or equal to 70%.

It is found that, when the image is formed using the lens array 150 of the specific example of the fourth embodiment, there is no degradation of the image quality such as a density unevenness (appearing in a high-density region), streaks, roughness or the like.

Figure 29:
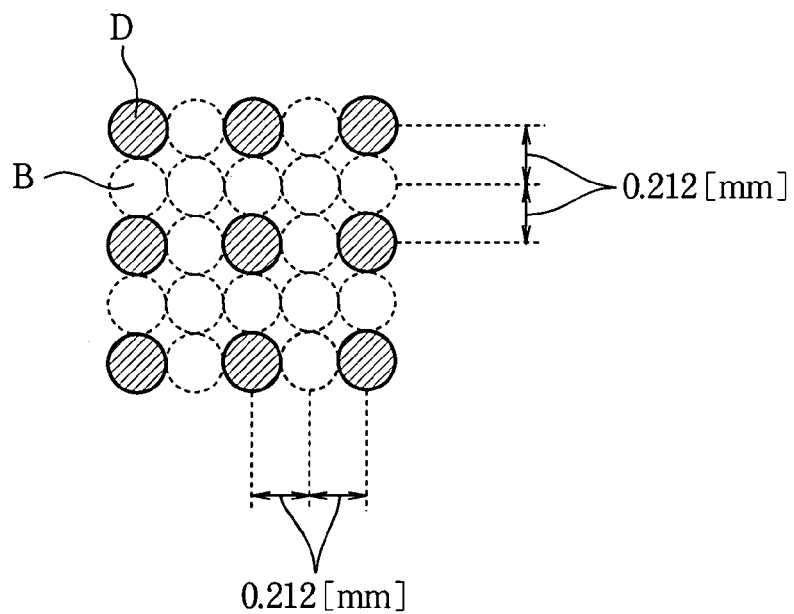
FIG. 29 shows "1×1" image used in the experiment in the fourth embodiment of the present invention.

FIG. 29 shows the "1×1" image of 1200 dpi used in the experiment in the fourth embodiment of the present invention.

As shown in FIG. 29, in order to evaluate the quality of the image formed by the printer, the "1×1" image is formed on the sheet, and the degradation of the image quality is evaluated. The "1×1" image is an image in which dots D are alternately formed at 600 dpi (i.e., at the interval of 0.0212 mm×2) in the vertical and horizontal directions on the dot matrix of 1200 dpi. In other words, the dots D and the blank spaces B are alternately formed in both of the vertical direction and the horizontal direction on the dot matrix of 1200 dpi.

When the image formed by the above described color printer using the lens array 150 (FIG. 21) of the specific example of the fourth embodiment is evaluated, it is found that there is no density unevenness, streaks, roughness nor the like. In contrast, the color printer using the lens array 150' of the comparative example can not print an image, because the LED head using the lens array 150' of the comparative example can not obtain the amount of light sufficient for forming an image.

As described above, according to the fourth embodiment of the present invention, the arrangement interval $P_N$ between the closest micro lenses 152 is smaller than the arrangement interval $P_Y$ in the arranging direction of the micro lenses 152, and therefore the resolution can be enhanced and the amount of light can be increased.

Further, using the printer according to the fourth embodiment of the present invention, the image can be formed on the sheet according to the print data without causing the density unevenness, streaks, roughness or the like.

The lens array of the fourth embodiment is applicable to the reading apparatus (as shown in FIG. 19) as described in the third embodiment.

Fifth Embodiment

The fifth embodiment of the present invention will be described.

The components having the same structures as those of the fourth embodiment are assigned the same reference numerals. Regarding the advantages obtained by the same structures, the description in the fourth embodiment is incorporated herein.

Figure 30:
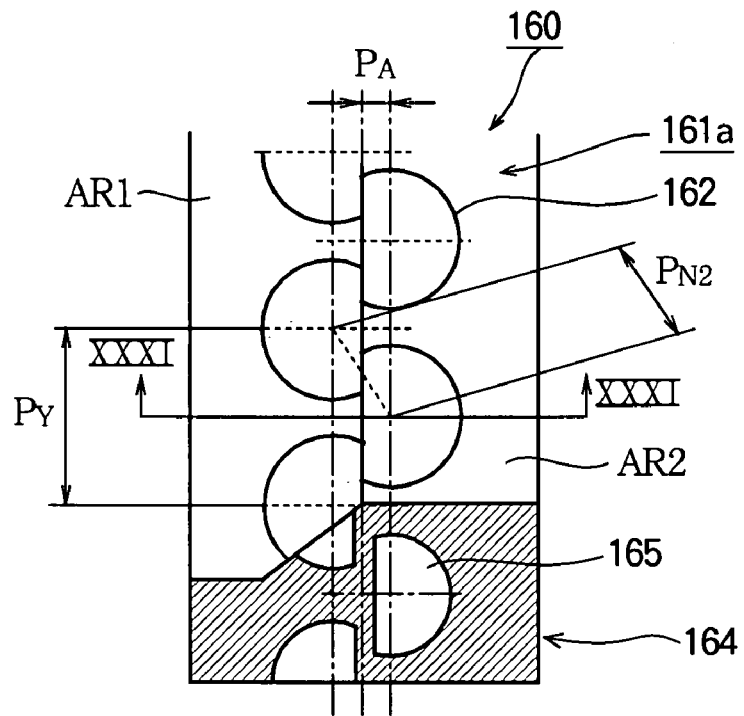
FIG. 30 is a plan view showing a lens array according to the fifth embodiment of the present invention.
Figure 31:
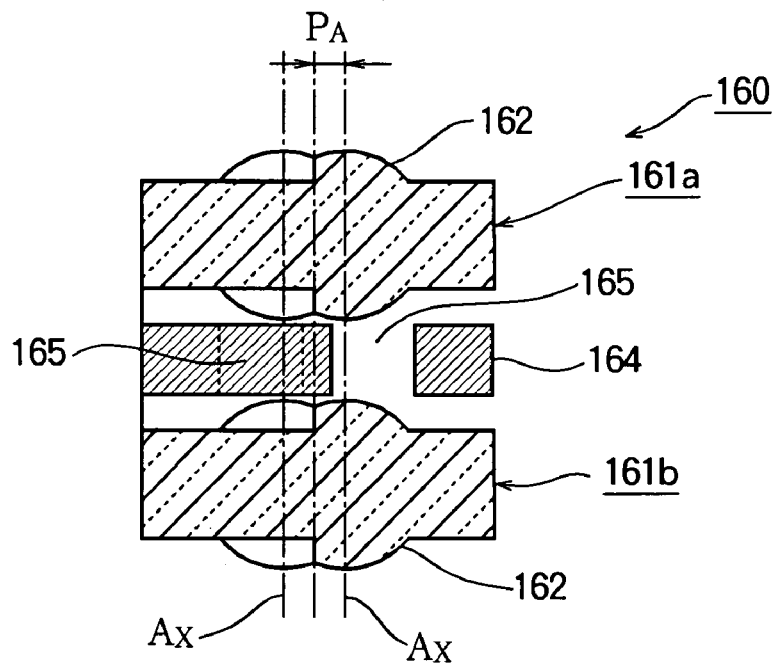
FIG. 31 is a cross sectional view taken along line XXXI-XXXI shown in FIG. 30.
Figure 32:
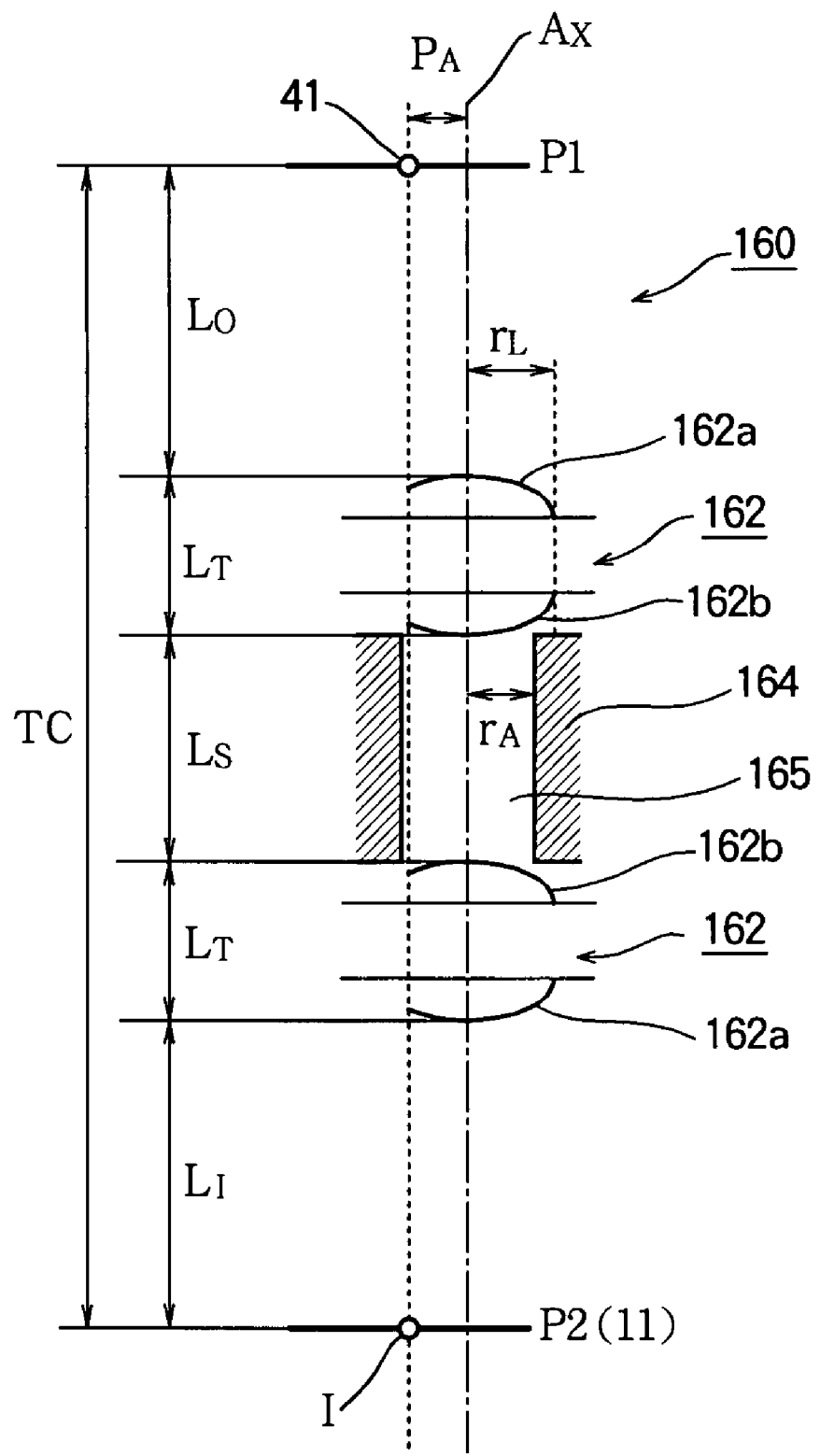
FIG. 32 shows an arrangement of optical elements of the lens array according to the fifth embodiment of the present invention.

FIG. 30 is a partially cutaway plan view of a lens array according to the fifth embodiment of the present invention. FIG. 31 is a cross sectional view taken along line XXXI-XXXI shown in FIG. 30. FIG. 32 shows an arrangement of optical elements of the lens array according to the fifth embodiment of the present invention.

As shown in FIG. 31, the lens array 160 includes two lens plates 161a and 161b arranged in two stages so that the lens plates 161a and 161b face each other. Each of the lens plates 161a and 161b has a plurality of micro lenses 162 having predetermined curved surfaces. The lens array 160 further includes a light-blocking portion 164 disposed between the lens plates 161a and 161b, and is formed of the comb-like members 113a and 113b (FIG. 22) as was described in the fourth embodiment. The light-blocking portion 164 has openings 165 disposed corresponding to the micro lenses 162. The micro lenses 162 are arranged in two rows in a staggered manner as was described in the fourth embodiment. Further, in this embodiment, the micro lenses 162 are so shaped that curved surfaces thereof are cut by a plane parallel to the optical axes of the micro lenses 162 in the direction in which the micro lenses 162 are arranged (i.e., the longitudinal direction of the lens plates 161a and 161b). Further, the micro lenses 162 are so shaped that the cutting surfaces of the micro lenses 162 of two rows mate each other.

The micro lenses 162 of the lens plates 161a and 161b and the openings 165 of the light-blocking portion 164 are arranged at the same arrangement interval. The centers of the openings 165 are aligned with the optical axes of the micro lenses 162 of the lens plates 161a and 161b. Each of the micro lenses 162 is configured to form an inverted image. The lens-pair (i.e., a pair of micro lenses 162 facing each other) is configured to form an erected image.

Each of the lens plates 161a and 161b is formed by joining two lens plate parts AR1 and AR2 (FIG. 30). The lens plate parts AR1 and AR2 are joined each other in the width direction of the lens plates 161a and 161b so that the micro lenses 162 are disposed in a staggered manner.

The arrangement interval of the micro lenses 162 of the lens plates 161a and 161b and the arrangement interval of the openings 165 of the light-blocking portion 164 are the same as each other, which is referred to as an arrangement interval $P_Y$ (FIG. 23). The interval (i.e., center-to-center distance) between the closest micro lenses 162 is referred to as an arrangement interval $P_{N2}$. The arrangement intervals $P_Y$ and $P_{N2}$ satisfy the relationship:

$$P_{N2} < P_Y$$

Further, the optical axis is defined to be a line connecting through both apexes of the curved surfaces of the micro lens 162. The maximum distance from the optical axis to the periphery of each micro lens 162 (i.e., the distance from the optical axis to the circumferential part of the periphery of each micro lens 162) is defined as a radius $r_L$ of the micro lens 162. The arrangement interval $P_{N2}$ and the radius $r_L$ satisfy:

$$P_{N2} < 2r_L$$

The distance between the center line of each row of the micro lenses 162 and the center line of the lens plate 161a (161b) in the width direction is referred to as a row-center-to-array-center distance $P_A$ as shown in FIG. 30. The row-center-to-array-center distance $P_A$ is expressed as the following equation (6):

$$P_A = \sqrt{\left(\frac{P_{N2}}{2}\right)^2 - \left(\frac{P_Y}{4}\right)^2} \quad (6)$$

Further, the following relationship is satisfied so that the lens array 160 is able to form a focused image:

$$P_{N2} > P_Y/2$$

For the verification of an advantage of the fifth embodiment, the lens array 160 of a specific example of the fifth embodiment is prepared. In the specific example, the radius $r_L$ is 0.500 mm, the arrangement interval $P_Y$ is 1.200 mm, and the arrangement interval $P_{N2}$ is 0.721 mm. In this case, the row-center-to-array-center distance $P_A$ is 0.200 mm according to the above described equation (6).

In the lens array 160 of the specific example of the fifth embodiment and the lens array 150' (FIG. 27) of the comparative example, the lens plates 161a and 161b are formed of cycloolefin-based resin "ZEONEX E48R" (product name) manufactured by Nihon Zeon Corporation. The micro lenses 162 are integrally formed on the respective lens plates 161a and 161b by resin molding.

In the specific example of the fifth embodiment, in a cross section perpendicular to the optical axis, the micro lens 162 substantially has the shape of a circle partially cut off by a straight line distant from the optical axis by 0.2 mm. Further, in a cross section perpendicular to the optical axis (of the micro lens 162), the opening 165 of the light-blocking portion 164 is in the shape of a circle cut off by a straight line. The light-blocking portion 164 prevents the light from passing through outside the micro lenses 162, and also prevents the light from passing through the center portion of the lens array 160 in the width direction.

The lens array 160 of the specific example of the fifth embodiment and the lens array 150' of the comparative example are configured as shown in TABLE 3.

TABLE 3

| MARK | PROPERTIES | EXAMPLE OF 5TH EMBODIMENT |
|---|---|---|
| $P_Y$ | ARRANGEMENT INTERVAL OF MICRO LENSES IN ARRANGING DIRECTION(mm) | 1.200 |
| $P_{N2}$ | ARRANGEMENT INTERVAL BETWEEN CLOSEST MICRO LENSES(mm) | 0.721 |
| $P_A$ | ROW-CENTER-TO-ARRAY-CENTER DISTANCE IN WIDTH DIRECTION (mm) | 0.200 |
| $L_O$ | DISTANCE BETWEEN OBJECT PLANE TO LENS SURFACE (mm) | 2.300 |
| $r_L$ | RADIUS OF MICRO LENS (mm) | 0.500 |
| $C_O$ | RADIUS OF CURVATURE OF OUTER CURVED SURFACE (mm) | 0.6915 |
| $A_O$ | 4TH ORDER ASPHERICAL COEFFICIENT OF OUTER CURVED SURFACE | −0.3150 |
| $B_O$ | 6TH ORDER ASPHERICAL COEFFICIENT OF OUTER CURVED SURFACE | −0.3378 |
| $C_I$ | RADIUS OF CURVATURE OF INNER CURVED SURFACE (mm) | −1.3786 |
| $A_I$ | 4TH ORDER ASPHERICAL COEFFICIENT OF INNER CURVED SURFACE | 0.6100 |
| $B_I$ | 6TH ORDER ASPHERICAL COEFFICIENT OF INNER CURVED SURFACE | 1.2575 |
| $L_T$ | LENS THICKNESS (mm) | 1.000 |
| $L_S$ | DISTANCE BETWEEN LENS SURFACES (mm) | 2.520 |
| $r_A$ | OPENING DIMENSION OF LIGHT BLOCKING PORTION (mm) | 0.450 |
| $L_I$ | DISTANCE BETWEEN IMAGE PLANE AND LENS SURFACE (mm) | 2.300 |
| TC | DISTANCE BETWEEN IMAGE PLANE AND OBJECT PLANE (mm) | 9.120 |
| MTF | MTF at 1200 dpi (%) | 94 |
| $I_r$ | AMOUNT OF LIGHT RELATIVE TO COMPARATIVE EXAMPLE (times) | 3.5 |

The respective surfaces of the micro lens 162 are rotationally-symmetric high-order aspheric surfaces, and expressed as the above described equations (4) and (5).

The micro lens 162 is so shaped that the micro lens 162 is cut off by a plane in the vicinity of the center line of the lens array 160. However, this does not limit the method for forming the micro lens 162. For example, it is possible to make a mold of a predetermined shape, and to form the micro lens 162 using a conventional resin molding method without having a step of cutting off the micro lens 162.

Although the micro lenses 162 are integrally formed with the lens plates 161a and 161b, it is also possible to individually form the micro lenses 162 and to fix the micro lenses 162 to the lens plates 161a and 161b at the predetermined intervals $P_Y$ and $P_{N2}$. Although the outer and inner curved surfaces 162a and 162b have rotationally-symmetric high-order aspheric surfaces, the outer and inner curved surfaces 162a and 162b can be spherical surfaces. Moreover, the outer and inner curved surfaces 162a and 162b can be conic surfaces (such as paraboloidal surfaces, ellipsoidal surfaces, hyperboloidal surfaces or the like), toroidal surfaces (asymmetric in the respective directions perpendicular to the optical axis) and cylindrical surfaces or the like. Further, the outer and inner curved surfaces 162a and 162b can be conventional free curved surfaces.

Further, although the micro lens 162 of this embodiment is composed of a single lens having two refracting surfaces (curved surfaces), it is also possible to use a compound lens (a combination of a plurality of single lenses) having four or more refracting surfaces.

Although the micro lens 162 is formed of a transparent material (transmitting the light emitted by the light source) having a uniform refractive index and having predetermined curved surfaces, it is also possible to use a lens, optical fibers or the like having a predetermined distribution of the refractive index.

Further, although the light-blocking portion 164 is formed of stainless steel plate, it is also possible to form a light-blocking pattern of a light-blocking material (that blocks the light emitted by the light source) on a material that transmits the light. It is also possible to form the light-blocking pattern of the light-blocking material partially on the lens plates 161a and 161b. It is also possible to partially roughen the surface of the lens plates 161a and 161b to block the light. It is also possible to partially cut down the lens plates 161a and 161b to prevent the incidence of a part of the light.

The operation of the LED head 23 will be described.

Figure 33:
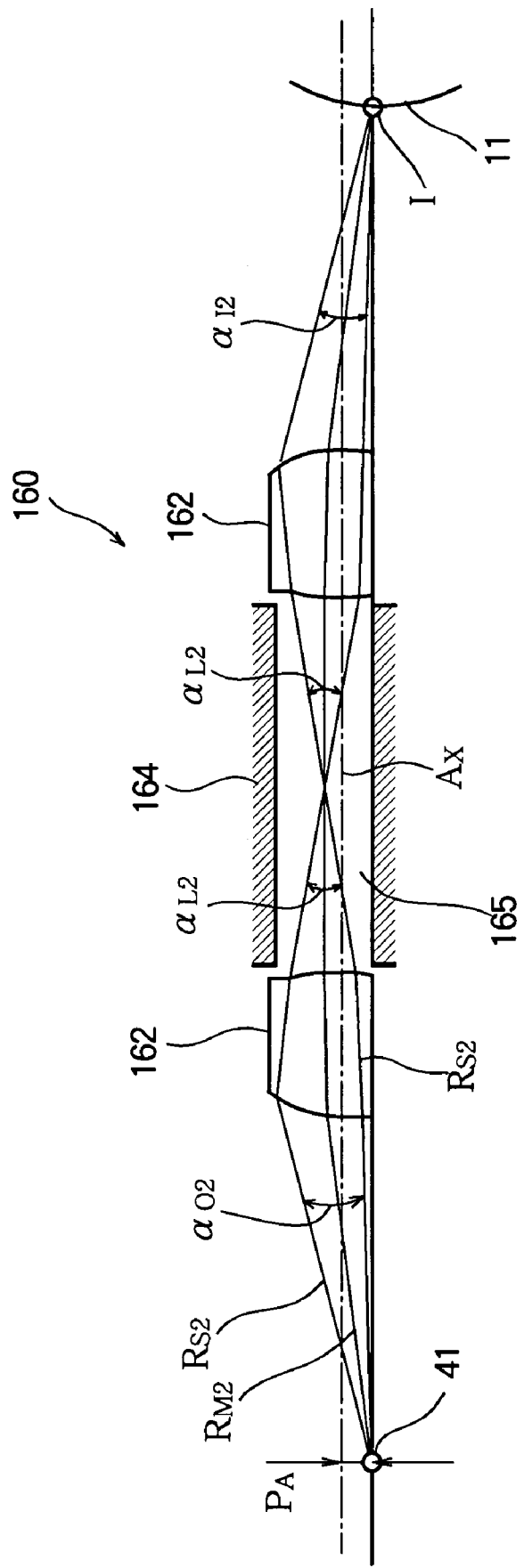
FIG. 33 shows an optical system of an LED head according to the fifth embodiment of the present invention.

FIG. 33 is a view showing an optical system of an LED head according to the specific example of the fifth embodiment of the present invention.

FIG. 33 shows a light path from the light emitting portion 41 to the focused image I formed by the lens array 160 (FIG. 32). In FIG. 33, only one LED element of the light emitting portion 41, two micro lenses 162 of the lens array 160, and the photosensitive drum 11 as the image bearing body are shown. The horizontal (left-to-right) direction in FIG. 33 is the direction of the optical axis between the light emitting portion 41 and the focused image I on the photosensitive drum 11. The micro lenses 162 and the LED elements are arranged in the direction perpendicular to the sheet of FIG. 33. Among the micro lenses 162 and the openings 165 of light-blocking portion 164, only one pair of micro lenses 162 and one opening 165 aligned with each other in the direction of the optical axis are shown in FIG. 33. Although not shown in FIG. 33, the micro lenses 162 of the second row and the corresponding openings 165 of the light-blocking portion 164 are provided below the micro lenses 162 of the first row and the corresponding openings 165 in a vertically symmetrical manner in FIG. 33.

As shown in FIG. 33, a light ray traveling along the shortest path of the lens array 160 of the specific example of the fifth embodiment is defined as a principal ray $R_{M2}$, and a light ray travelling along the outermost path of the micro lens 162 is defined as a rim ray $R_{S2}$.

The angular angle of the light emitted by the light emitting portion 41 of the specific example of the fifth embodiment is referred to as an angular angle $\alpha_{O2}$, and the angular angle of the light incident on the photosensitive drum 11 is referred to as an angular angle $\alpha_{I2}$. The angular angle of the light emitted by and incident on the respective micro lenses 162 of the specific example of the fifth embodiment is referred to as an angular angle $\alpha_{L2}$.

The angular angles $\alpha_{O2}$, $\alpha_{I2}$ and $\alpha_{L2}$ of the lens array 160 of the specific example of the fifth embodiment are greater than the angular angles of the comparative example. This means that the focused image of the light emitting portion 41 focused by the lens array 160 of the specific example of the fifth embodiment is brighter than the focused image focused by the lens array 150' of the comparative example.

In the lens array 160 having two rows of the micro lenses 162, the center line of the lens array 160 in the width direction is positioned on a line connecting the light emitting portion 41 and the focused image I focused by the lens array 160. The distance between the center line of the lens array 160 and the optical axis of the micro lens 162 is the above described row-center-to-array-center distance $P_A$. The row-center-to-array-center distance $P_A$ of the lens array 160 of the specific example of the fifth embodiment is 0.200 mm, and the row-center-to-array-center distance $P_A$ of the lens array 150' of the comparative example is 0.520 mm.

Generally, when an image of an object is focused using the lens, the aberration becomes smaller and the amount of light increases, as the object is closer to the optical axis of the lens.

In the lens array 160 of the specific example of the fifth embodiment, the optical axes of the micro lenses 162 are closer to the light emitting portions 41 compared with the lens array 150' (FIG. 27) of the comparative example. Therefore, when the lens array 160 according to the fifth embodiment is used, it becomes possible to obtain the sharp focused image exhibiting small aberration. Therefore, it becomes possible to enhance the resolution of the focused image and to increase the amount of light.

As shown in TABLE 3, when lens array 160 of the specific example of the fifth embodiment is used, the amount of the light is 3.5 times the amount of light when the lens array 150' of the comparative example is used. In other words, using the lens array 160 of the specific example of the fifth embodiment, a sufficient amount of light for the LED head 23 of a printer can be obtained. Further, when the lens array 160 of the specific example of the fifth embodiment is used, the MTF is 94% (i.e., sufficient value), i.e., not lower than that when the lens array 150' of the comparative example is used.

As described above, according to the fifth embodiment, the arrangement interval $P_{N2}$ between the closest micro lenses 162 is shorter than the arrangement interval $P_Y$ of the micro lenses 162 in the arranging direction, so that the resolution can be enhanced and the amount of light can be increased.

The lens array of the fifth embodiment is applicable to the reading apparatus (FIG. 19) as described in the third embodiment.

Sixth Embodiment

Next, the sixth embodiment of the present invention will be described. The components having the same structures as those of the fourth or fifth embodiment are assigned the same reference numerals. Regarding the advantages obtained by the same structures, the description in the fourth or fifth embodiment is incorporated herein.

Figure 34:
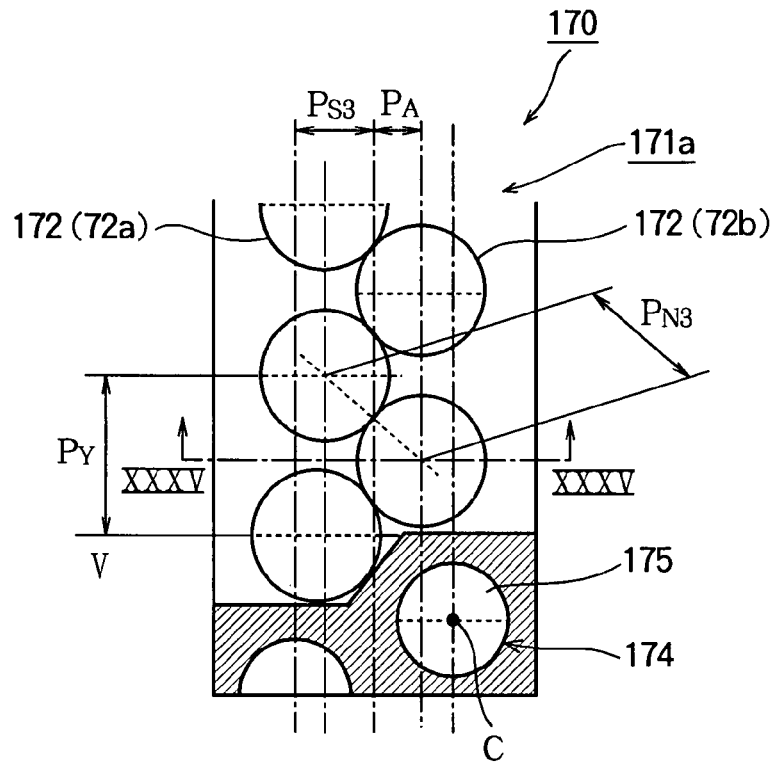
FIG. 34 is a partially cutaway plan view showing a lens array according to the sixth embodiment of the present invention.
Figure 35:
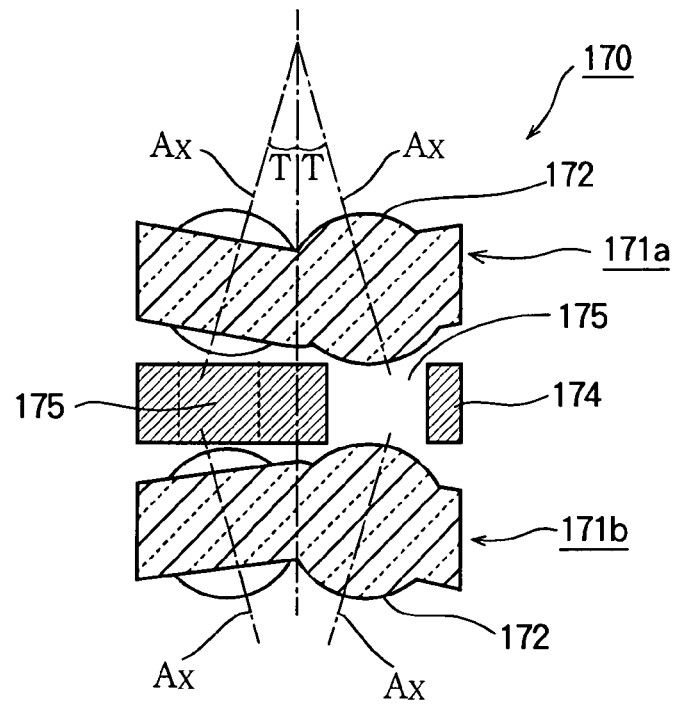
FIG. 35 is a cross sectional view taken along line XXXV-XXXV shown in FIG. 34.
Figure 36:
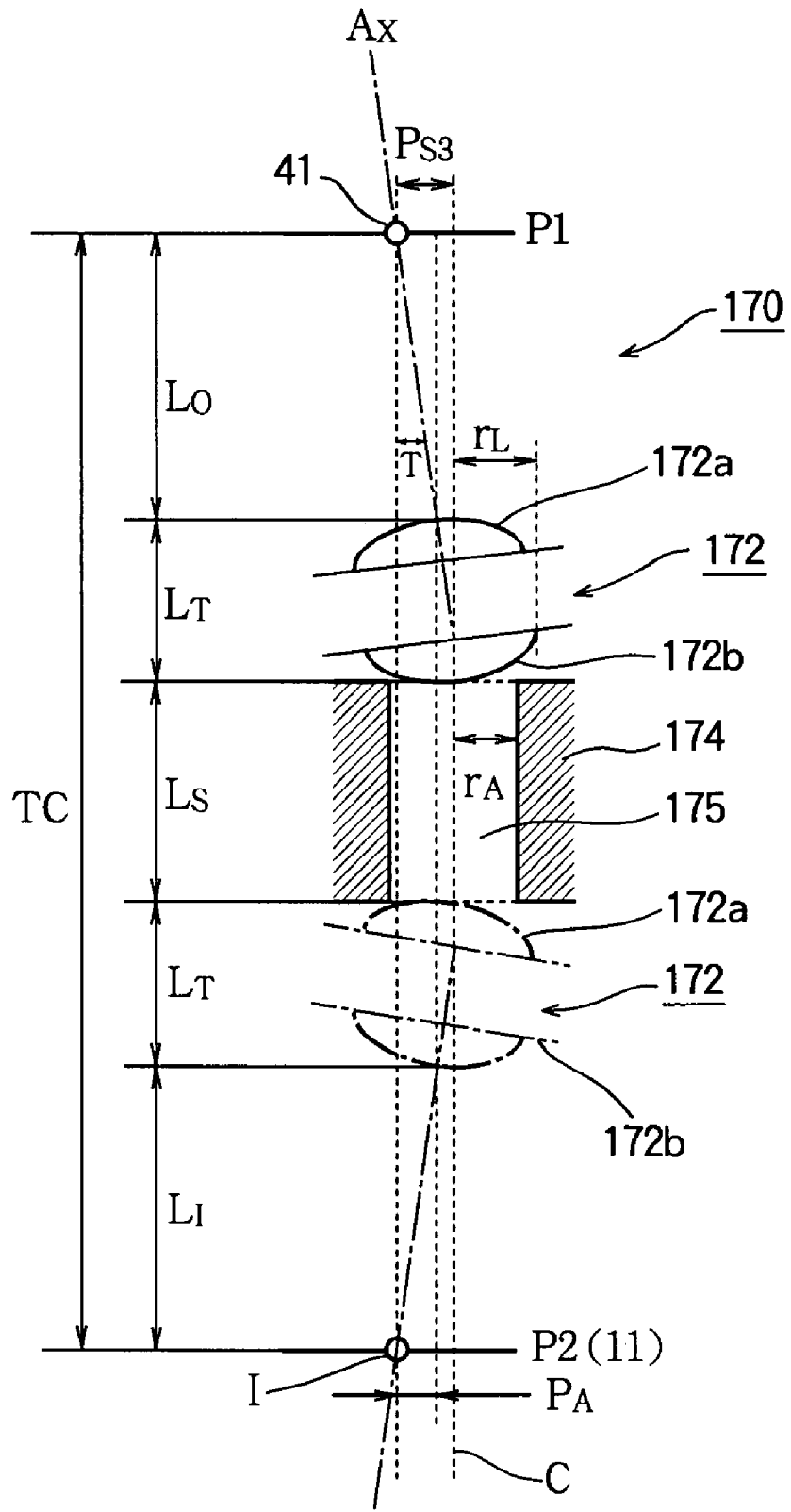
FIG. 36 shows an arrangement of optical elements of the lens array according to the sixth embodiment of the present invention.

FIG. 34 is a partially cutaway plan view showing an LED head according to the sixth embodiment of the present invention. FIG. 35 is a sectional view taken along line XXXV- XXXV in FIG. 34. FIG. 36 shows an arrangement of optical elements of the lens array according to the sixth embodiment of the present invention.

As shown in FIG. 35, the lens array 170 includes two lens plates 171a and 171b arranged in two stages so that the lens plates 171a and 171b face each other. Each of the lens plates 171a and 171b includes a plurality of micro lenses 172 having predetermined curved surfaces. As shown in FIG. 34, the micro lenses 172 are arranged in two rows and arranged in a staggered manner.

Further, as shown in FIG. 35, the lens array further includes light-blocking portion 174 made of light-blocking material and disposed between the lens plates 171a and 171b. The light-blocking portion 174 includes a plurality of openings 175 corresponding to the micro lenses 172 of the lens plates 171a and 171b.

The micro lenses 172 of the lens plates 171a and 171b and the openings 175 of the light-blocking portion 174 are arranged at the same arrangement interval.

In this embodiment, the micro lenses 172 include first lenses 172a disposed on the left side of the center line of the lens array 170 in FIG. 34 and second lenses 172b disposed on the right side of the center line of the lens array 170 in FIG. 34. As shown in FIG. 35, the optical axes Ax of first and second lenses 172a and 172b of the lens plate 171a intersect with each other on a predetermined position (in this example, on light emitting portion 41) on the light emitting portion 41 side, i.e., on the object plane side. Further, the optical axes Ax of first and second lenses 172a and 172b of the lens plate 171b intersect with each other on a predetermined position (in this example, on the photosensitive drum 11) on the photosensitive drum 11 side, i.e., on the image plane side. The optical axes Ax are inclined at an angle T (degrees) with respect to the width direction of the lens array 170.

The arrangement interval of the micro lenses 172 of the lens plates 171a and 171b and the arrangement interval of the openings 175 are the same as each other, which is referred to as an arrangement interval $P_Y$. The interval (i.e., center-to-center distance) between the closest micro lenses 172 is referred to as an arrangement interval $P_{N3}$. The arrangement intervals $P_Y$ and $P_{N3}$ satisfy the relationship:

$$P_{N3} < P_Y.$$

The straight line connecting the apexes of the curved surfaces of the micro lens 172 is defined as the optical axis Ax. The distance from the optical axis Ax to the periphery of the micro lens 172 is defined as a radius $r_L$. The arrangement interval $P_{N3}$ and the radius $r_L$ satisfy the following relationship:

$$P_{N3} < 2r_L.$$

Further, the distance between the center line of each row of the micro lenses 172 and the center line of the lens plate 171a (171b) in the width direction is referred to as a row-center-to-array-center distance $P_A$ (FIG. 34). The row-center-to-array-center distance $P_A$ is expressed as the following equation (7):

$$P_A = \sqrt{\left(\frac{P_{N3}}{2}\right)^2 - \left(\frac{P_Y}{4}\right)^2} \tag{7}$$

For the verification of an advantage of the sixth embodiment, the lens array 170 of a specific example of the sixth embodiment is prepared. In the specific example of the sixth embodiment, the radius $r_L$ is 0.500 mm, the arrangement interval $P_Y$ is 1.200 mm, and the arrangement interval $P_{N3}$ is 0.941 mm. In this case, the row-center-to-array-center distance $P_A$ is 0.362 mm according to the above described equation (7).

The light-blocking portion 174 of the lens array 170 of the specific example of the sixth embodiment prevents the light from passing through the outside of the micro lenses 172. The center C of the opening 175 is distanced from the center of the lens array 170 in the width direction by the distance $P_{S3}$ (i.e., an opening-center-to-array-center distance). In the specific example of the sixth embodiment, the distance $P_{S3}$ is 0.520 mm.

The lens array 170 of the specific example of the sixth embodiment and the lens array 150' (FIG. 27) of the comparative example are configured as the following TABLE 4.

TABLE 4

| MARK | PROPERTIES | EXAMPLE OF 6TH EMBODIMENT | COMPARATIVE EXAMPLE |
|---|---|---|---|
| T | INCLINATION OF OPTICAL AXIS OF MICRO LENS (degrees) | 8.948 | 0.000 |
| $P_Y$ | ARRANGEMENT INTERVAL OF MICRO LENSES IN ARRANGING DIRECTION(mm) | 1.200 | 1.200 |
| $P_{N3}$ | ARRANGEMENT INTERVAL BETWEEN CLOSEST MICRO LENSES (mm) | 0.941 | 1.200 |
| $P_A$ | ROW-CENTER-TO-ARRAY-CENTER DISTANCE IN WIDTH DIRECTION (mm) | 0.362 | 0.520 |
| $P_{S3}$ | OPENING-CENTER-TO-ARRAY-CENTER DISTANCE IN WIDTH DIRECTION (mm) | 0.520 | 0.520 |
| $L_O$ | DISTANCE BETWEEN OBJECT PLANE TO LENS SURFACE (mm) | 2.300 | 2.300 |
| $r_L$ | RADIUS OF MICRO LENS (mm) | 0.500 | 0.500 |
| $C_O$ | RADIUS OF CURVATURE OF OUTER CURVED SURFACE (mm) | 0.8645 | 0.5833 |
| $A_O$ | 4TH ORDER ASPHERICAL COEFFICIENT OF OUTER CURVED SURFACE | −0.3845 | −0.3904 |
| $B_O$ | 6TH ORDER ASPHERICAL COEFFICIENT OF OUTER CURVED SURFACE | −0.2100 | −0.1618 |
| $C_I$ | RADIUS OF CURVATURE OF INNER CURVED SURFACE (mm) | −0.8908 | −0.8936 |

TABLE 4-continued

| MARK | PROPERTIES | EXAMPLE OF 6TH EMBODIMENT | COMPARATIVE EXAMPLE |
|---|---|---|---|
| $A_I$ | 4TH ORDER ASPHERICAL COEFFICIENT OF INNER CURVED SURFACE | 0.4542 | 0.4474 |
| $B_I$ | 6TH ORDER ASPHERICAL COEFFICIENT OF INNER CURVED SURFACE | −0.0753 | −0.0398 |
| $L_T$ | LENS THICKNESS (mm) | 1.012 | 1.000 |
| $L_S$ | DISTANCE BETWEEN LENS SURFACES (mm) | 2.520 | 2.520 |
| $r_A$ | OPENING DIMENSION OF LIGHT BLOCKING PORTION (mm) | 0.450 | 0.450 |
| $L_I$ | DISTANCE BETWEEN IMAGE PLANE AND LENS SURFACE (mm) | 2.300 | 2.300 |
| TC | DISTANCE BETWEEN IMAGE PLANE AND OBJECT PLANE (mm) | 9.120 | 9.120 |
| MTF | MTF at 1200 dpi (%) | 91 | 91 |
| $I_r$ | AMOUNT OF LIGHT RELATIVE TO COMPARATIVE EXAMPLE (times) | 1.8 | 1.0 |

In the lens array 170 of the specific example of the sixth embodiment, the angle T is set as follows:

$$T = \tan^{-1}(P_A/L_O)$$
$$= 8.948 \text{ (degrees)}$$

The respective surfaces of the micro lens 172 are rotationally-symmetric high-order aspheric surfaces, and expressed as the above described equations (4) and (5).

In the sixth embodiment, the micro lenses 172 are inclined with respect to the width direction of the lens array 170. However, this does not limit the method for forming the micro lenses 172. For example, it is possible to make a mold of a predetermined shape, and to form the micro lens 172 using a conventional resin molding method without having a step of cutting off the micro lens 172.

The operation of the LED head 23 will be described.

Figure 37:
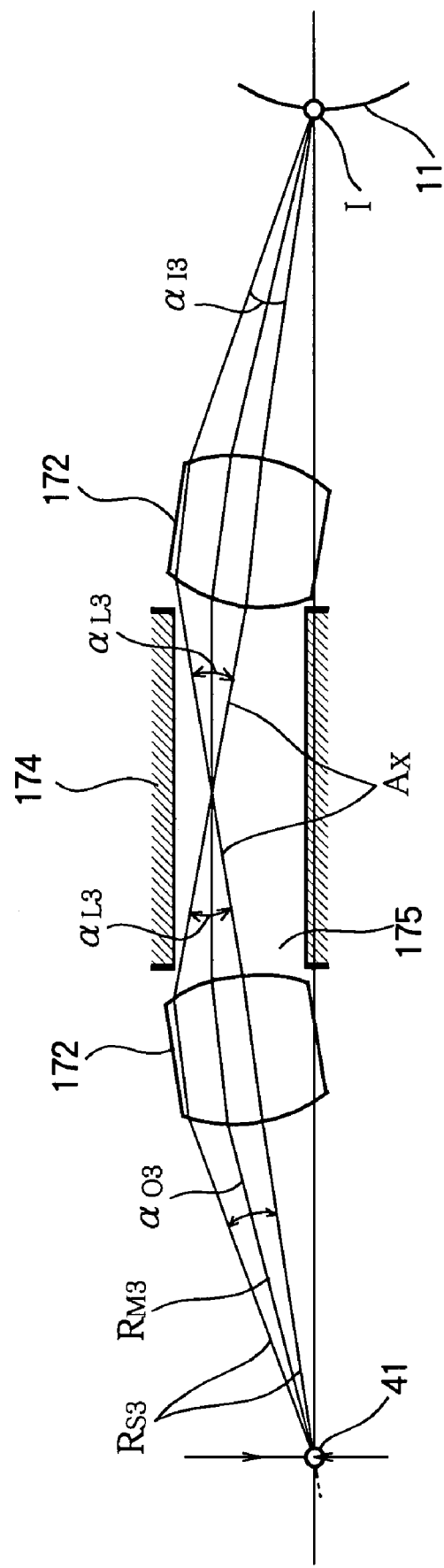
FIG. 37 shows an optical system of an LED head according to the sixth embodiment of the present invention.

FIG. 37 shows an optical system of the LED head according to the sixth embodiment.

FIG. 37 shows a light path from the light emitting portion 41 to the focused image I formed by the lens array 170 (FIG. 35). In FIG. 37, only one LED element of the light emitting portion 41, two micro lenses 172 of the lens array 170, and the photosensitive drum 11 as the image bearing body are shown. The horizontal (left-to-right) direction in FIG. 37 is the direction of the optical axis between the light emitting portion 41 and the focused image on the photosensitive drum 11. The micro lenses 172 and the light emitting portions 41 (LED elements) are arranged in the direction perpendicular to the sheet of FIG. 37. Among the micro lenses 172 and the openings 175 of light-blocking portion 174, only one pair of micro lenses 172 and one opening 175 aligned with each other in the direction of the optical axes are shown in FIG. 37. Although not shown in FIG. 37, the micro lenses 172 of the second row and the corresponding openings 175 of the light-blocking portion 174 are disposed below the micro lenses 172 of the first row and the corresponding openings 175 in a vertically symmetrical manner in FIG. 37.

As shown in FIG. 37, a light ray traveling along the shortest path of the lens array 170 of the specific example of the sixth embodiment is defined as a principal ray $R_{M3}$, and a light ray travelling along the outermost path of the micro lens 172 is defined as a rim ray $R_{S3}$.

The angular angle of the light emitted by the light emitting portion 41 of the specific example of the sixth embodiment is referred to as an angular angle $\alpha_{O3}$, and the angular angle of the light incident on the photosensitive drum 11 is referred to as an angular angle $\alpha_{I3}$. The angular angle of the light emitted by and incident on the respective micro lenses 162 of the specific example of the sixth embodiment is referred to as an angular angle $\alpha_{L3}$.

The angular angles $\alpha_{O3}$, $\alpha_{I3}$ and $\alpha_{L3}$ of the lens array 170 of the specific example of the sixth embodiment are greater than the angular angles of the comparative example (FIG. 27). This means that the focused image of the light emitting portion 41 focused by the lens array 170 of the specific example of the sixth embodiment is brighter than the focused image focused by the lens array 150' of the comparative example.

Further, since the micro lenses 172 are arranged in two rows and since the above described relationship $P_{N3} < P_Y$ is satisfied, the optical axes of the micro lenses 172 can be disposed closer to the light emitting portion 41.

The lens array 170 of the specific example of the sixth embodiment has a configuration in which the optical axes of the micro lenses 172 are inclined, and therefore the optical axes Ax of the micro lenses 172 can be disposed closer to the light emitting portion 41. Particularly, the optical axes Ax of the micro lenses 172 are aligned on the light emitting portion 41 (see FIG. 37). In other words, the light emitting portion 41 is disposed on the optical axes of the micro lenses 172. This is the case when the angle T is expressed as follows:

$$T = \tan^{-1}(P_A/L_O)$$

In this regard, it is preferable to set the angle T in the following range:

$$0 < T < 2 \times \tan^{-1}(P_A/L_O)$$

Generally, when an image of an object is focused using the lens, the aberration becomes smaller and the amount of light increases, as the object is closer to the optical axis of the lens.

In the lens array 170 of the specific example of the sixth embodiment, the optical axes of the micro lenses 172 are closer to the light emitting portions 41 compared with the lens array 150' of the comparative example. Therefore, when the lens array 170 of the specific example of the sixth embodiment is used, it becomes possible to obtain the sharp focused image exhibiting small aberration. Therefore, it becomes possible to increase the resolution of the focused image and to increase the amount of light.

As shown in TABLE 4, when the lens array 170 of the specific example of the sixth embodiment is used, the amount of the light is 1.8 times the amount of light when the lens array 150' of the comparative example is used. In other words, when the lens array 170 of the specific example of the sixth embodiment is used, a sufficient amount of light for the LED head 23 of the printer can be obtained. Further, when the lens array 170 of the specific example of the sixth embodiment is used, the MTF is 91% (i.e., sufficient value), i.e., not lower than the MTF when the lens array 150' of the comparative example is used.

As a result of accumulated evaluations using the color LED printer, it has been clear that there is no degradation of the quality of the image formed on the sheet such as a density unevenness (appearing in a high-density region), streaks, roughness or the like when the MTF is greater than or equal to 70%.

When the image is formed using the lens array 170 of the specific example of the sixth embodiment, it is found that there is no degradation of the image quality such as a density unevenness (appearing in a high-density region), streaks, roughness or the like.

As described above, according to the sixth embodiment, the optical axes Ax of the micro lenses 172 are inclined with respect to the width direction of the lens array 170, and therefore the distance $P_{S3}$ between the center C of the opening 175 of the light-blocking portion 174 and the center of the lens array 170 in width direction is, for example, 0.520 mm. In this regard, in the comparative example, the distance $P_S$ between the center of the opening 155' and the center of the lens array 150' in the width direction is 0.520 mm (same as the row-center-to-array-center distance $P_A$). Therefore, the distance $P_{S3}$ and the distance $P_S$ are the same as each other. Since the amount of light can be increased without reducing the distance $P_{S3}$, the manufacturing of the lens array 170 of this embodiment is easier than the lens array of the fourth and fifth embodiments.

Furthermore, since the optical axes of the micro lenses 172 are inclined with respect to the width direction of the lens array 170, the arrangement interval $P_{N3}$ can be relatively large. Therefore, the lens array 170 of this embodiment can be easily manufactured.

The lens array of the sixth embodiment is applicable to the reading apparatus (FIG. 19) as described in the third embodiment.

Seventh Embodiment

Next, the seventh embodiment of the present invention will be described. The components having the same structures as those of the fourth, fifth or sixth embodiment are assigned the same reference numerals. Regarding the advantages obtained by the same structures, the description in the fourth, fifth or sixth embodiment is incorporated herein.

Figure 38:
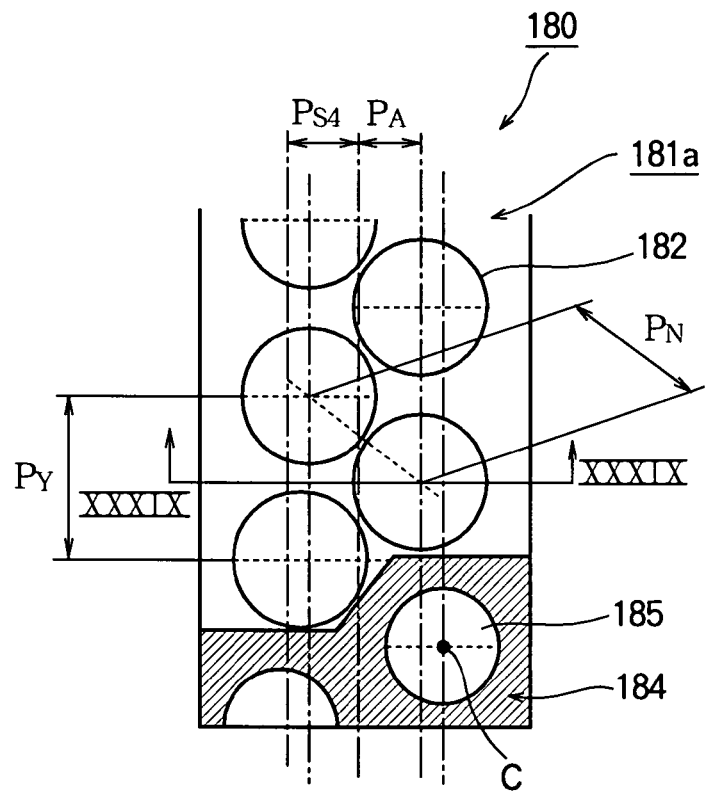
FIG. 38 is a partially cutaway plan view showing a lens array according to the seventh embodiment of the present invention.
Figure 39:
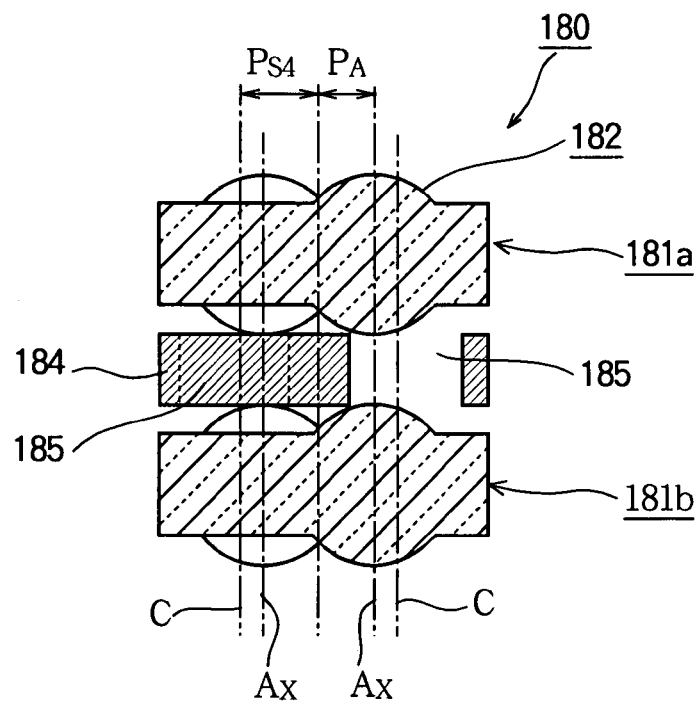
FIG. 39 is a sectional view taken along line XXXIX-XXXIX shown in FIG. 38.

FIG. 38 is a partially cutaway plan view showing an LED head according to the seventh embodiment of the present invention. FIG. 39 is a sectional view taken along line XXXIX-XXXIX in FIG. 38.

As shown in FIGS. 38 and 39, the lens array 180 includes two lens plates 181a and 181b arranged in two stages so that the lens plates 181a and 181b face each other. Each of the lens plates 181a and 181b includes a plurality of micro lenses 182 having predetermined curved surfaces. As shown in FIG. 38, the micro lenses 182 are arranged in two rows and arranged in a staggered manner.

Further, as shown in FIG. 39, the lens array further includes a light-blocking portion 184 made of light-blocking material and disposed between the lens plates 181a and 181b. The light-blocking portion 184 has a plurality of openings 185 corresponding to the micro lenses 182 of the lens plates 181a and 181b. The micro lenses 182 of the lens plates 181a and 181b and the openings 185 of the light-blocking portion 184 are arranged at the same arrangement interval. Optical axes Ax of the micro lenses 182 of the lens plate 181a are aligned with the optical axes Ax of the micro lenses 182 of the lens plate 181b.

In this embodiment, the centers C of the openings 185 are disposed outside with respect to the optical axes Ax of the micro lenses 182 in the width direction of the lens array 180.

The arrangement interval of the micro lenses 182 of the lens plates 181a and 181b and the arrangement interval of the openings 185 in the direction in which the micro lenses 182 are arranged are the same as each other. The arrangement interval of the micro lenses 182 is referred to as an arrangement interval $P_Y$, and the interval (i.e., center-to-center distance) between the closest micro lenses 182 is referred to as an arrangement interval $P_{N4}$. The arrangement intervals $P_Y$ and $P_{N4}$ satisfy:

$$P_{N4} < P_Y.$$

The distance between the center line of each row of the micro lenses 182 and the center line of the lens plate 181a (181b) in the width direction is referred to as a row-center-to-array-center distance $P_A$ (FIG. 38). The row-center-to-array-center distance $P_A$ is expressed as the following equation (8):

$$P_A = \sqrt{\left(\frac{P_{N4}}{2}\right)^2 - \left(\frac{P_Y}{4}\right)^2} \tag{8}$$

For the verification of an advantage of the seventh embodiment, the lens array 180 of a specific example of the seventh embodiment is prepared. In the specific example of the seventh embodiment, the radius $r_L$ is 0.500 mm, the arrangement interval $P_Y$ is 1.200 mm, and the arrangement interval $P_{N4}$ is 1.000 mm. In this case, the row-center-to-array-center distance $P_A$ is 0.400 mm according to the above described equation (8).

In the lens array 180 of the specific example of the seventh embodiment, the centers C of the openings 185 are distanced from the center line of the lens array 180 in the width direction by the distance $P_{S4}$ (i.e., an opening-center-to-array-center distance). In the specific example of the seventh embodiment, the distance $P_{S4}$ is 0.500 mm.

The lens array 180 of the specific example of the seventh embodiment and the lens array 150' of the comparative example (FIG. 27) are configured as the following TABLE 5.

TABLE 5

| MARK | PROPERTIES | EXAMPLE OF 7TH EMBODIMENT | EXAMPLE OF 4TH EMBODIMENT | COMPARATIVE EXAMPLE |
|---|---|---|---|---|
| $P_Y$ | ARRANGEMENT INTERVAL OF MICRO LENSES IN ARRANGING DIRECTION(mm) | 1.200 | 1.200 | 1.200 |
| $P_{N4}$ | ARRANGEMENT INTERVAL BETWEEN CLOSEST MICRO LENSES (mm) | 1.000 | 1.000 | 1.200 |
| $P_A$ | ROW-CENTER-TO-ARRAY-CENTER DISTANCE IN WIDTH DIRECTION (mm) | 0.400 | 0.400 | 0.520 |
| $P_{S3}$ | OPENING-CENTER-TO-ARRAY-CENTER DISTANCE IN WIDTH DIRECTION (mm) | 0.500 | 0.400 | 0.400 |
| $L_O$ | DISTANCE BETWEEN OBJECT PLANE TO LENS SURFACE (mm) | 2.300 | 2.300 | 2.300 |
| $r_L$ | RADIUS OF MICRO LENS (mm) | 0.500 | 0.500 | 0.500 |
| $C_O$ | RADIUS OF CURVATURE OF OUTER CURVED SURFACE (mm) | 0.8645 | 0.8645 | 0.5833 |
| $A_O$ | 4TH ORDER ASPHERICAL COEFFICIENT OF OUTER CURVED SURFACE | −0.3845 | −0.3845 | −0.3904 |
| $B_O$ | 6TH ORDER ASPHERICAL COEFFICIENT OF OUTER CURVED SURFACE | −0.2100 | −0.2100 | −0.1618 |
| $C_I$ | RADIUS OF CURVATURE OF INNER CURVED SURFACE (mm) | −0.8908 | −0.8908 | −0.8936 |
| $A_I$ | 4TH ORDER ASPHERICAL COEFFICIENT OF INNER CURVED SURFACE | 0.4542 | 0.4542 | 0.4474 |
| $B_I$ | 6TH ORDER ASPHERICAL COEFFICIENT OF INNER CURVED SURFACE | −0.0753 | −0.0753 | −0.0398 |
| $L_T$ | LENS THICKNESS (mm) | 1.000 | 1.000 | 1.000 |
| $L_S$ | DISTANCE BETWEEN LENS SURFACES (mm) | 2.540 | 2.540 | 2.520 |
| $r_A$ | OPENING DIMENSION OF LIGHT-BLOCKING PORTION (mm) | 0.450 | 0.450 | 0.450 |
| $L_I$ | DISTANCE BETWEEN IMAGE PLANE AND LENS SURFACE (mm) | 2.300 | 2.300 | 2.300 |
| TC | DISTANCE BETWEEN IMAGE PLANE AND OBJECT PLANE (mm) | 9.140 | 9.140 | 9.120 |
| MTF | MTF at 1200 dpi (%) | 95 | 91 | 91 |
| $I_r$ | AMOUNT OF LIGHT RELATIVE TO COMPARATIVE EXAMPLE (times) | 2.0 | 2.2 | 1.0 |

TABLE 5 also shows the configuration of the lens array 150 (FIG. 23) of the specific example of the fourth embodiment for comparison.

The respective surfaces of the micro lens 182 are rotationally-symmetric high-order aspheric surfaces, and expressed as the above described equations (4) and (5).

Although the centers C of the openings 185 are disposed outside with respect to the optical axes Ax of the micro lenses 182 in the width direction of the lens array 180 in this embodiment, it is only necessary that the light-blocking portion 184 allows a larger amount of light to pass through the outside of the optical axes Ax of the micro lenses 182 in the width direction of the lens array 180. For example, the openings 185 of the light-blocking portion 184 can have shapes (for example, an ellipsoidal shape, a drum shape or the like) allowing a larger amount of light to pass through outside of the optical axes Ax of the micro lenses 182 in the width direction of the lens array 180.

The operation of the LED head 23 will be described.

Figure 40:
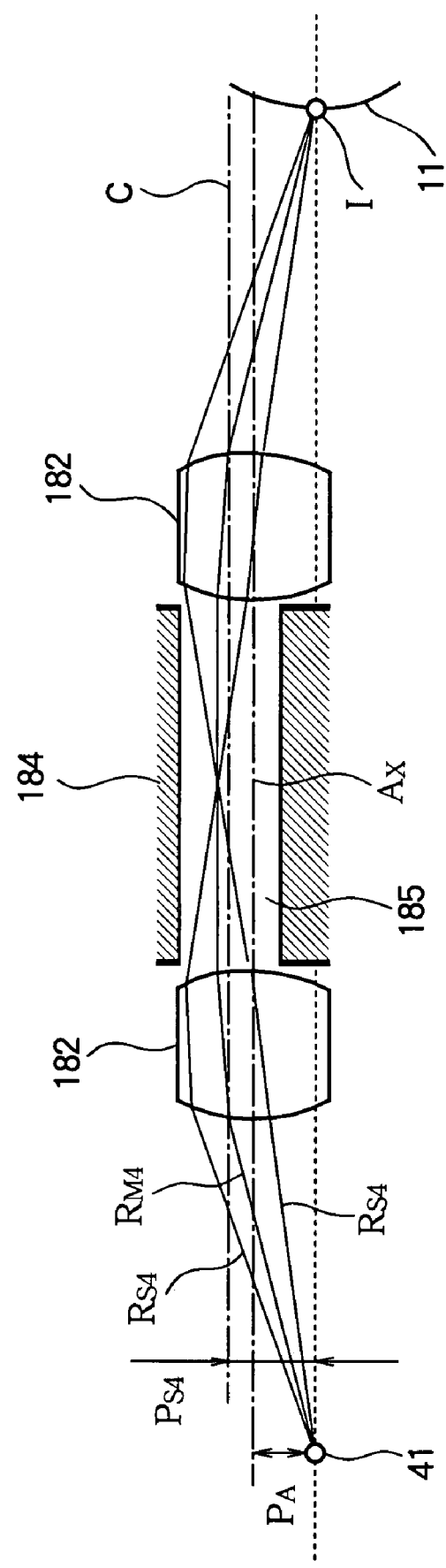
FIG. 40 shows an optical system of an LED head according to the seventh embodiment of the present invention.

FIG. 40 shows an optical system of the LED head according to the seventh embodiment.

FIG. 40 shows a light path from the light emitting portion 41 to the focused image I formed by the lens array 180 (FIG. 38). In FIG. 40, only one LED element of the light emitting portion 41, two micro lenses 182 of the lens array 180, and the photosensitive drum 11 as the image bearing body are shown. The horizontal (left-to-right) direction in FIG. 40 is the direction of the optical axis between the light emitting portion 41 and the focused image I on the photosensitive drum 11. The micro lenses 182 and the LED elements are arranged in the direction perpendicular to the sheet of FIG. 39. Among the micro lenses 182 and the openings 185 of light-blocking portion 184, only one pair of micro lenses 182 and one opening 185 aligned with each other in the direction of the optical axes are shown in FIG. 40. Although not shown in FIG. 40, the micro lenses 182 of the second row and the corresponding openings 185 of the light-blocking portion 184 are disposed below the micro lenses 182 of the first row and the corresponding openings 185 in a vertically symmetrical manner in FIG. 40.

As shown in FIG. 40, a light ray traveling along the shortest path of the lens array 180 of the specific example of the seventh embodiment is defined as a principal ray $R_{M4}$, and a light ray travelling along the outermost path of the micro lens 182 is defined as a rim ray $R_{S4}$.

In the lens array 180 of specific example of the seventh embodiment, the light path between the micro lenses 182 is disposed outside with respect to the optical axes Ax of the micro lenses 182.

Since the openings 185 of the light-blocking portion 184 are disposed outside with respect to the optical axes Ax of the micro lenses 182 in the width direction of the lens array 180, the light (including stray light) that may cause aberration is blocked. Therefore, using the lens array 180 of the specific example of the seventh embodiment, it becomes possible to enhance the resolution, compared with the forth, fifth and sixth embodiments. In this case, the decrease in the amount of light is relatively small.

As shown in TABLE 5, when the specific example of the lens array 180 of the specific example of the seventh embodiment is used, the amount of light is 2.0 times the amount of light when the lens array 150' of the comparative example is used. In other words, when the lens array 180 of the specific example of the seventh embodiment is used, the sufficient amount of light for the LED head 23 of the printer can be obtained. Further, when the lens array 180 of the specific example of the seventh embodiment is used, the MTF is 95% (i.e., sufficient value), i.e., not lower than the MTF when the lens array 150' of the comparative example is used.

As a result of accumulated evaluations using the color LED printer, it has been clear that there is no degradation of the quality of the image formed on the sheet such as a density unevenness (appearing in a high-density region), streaks, roughness or the like when the MTF is greater than or equal to 70%.

When the image is formed using the lens array 180 of the specific example of the seventh embodiment, it is found that there is no degradation of the image quality such as a density unevenness (appearing in a high-density region), stripes, roughness or the like.

From TABLE 5, it is understood that, according to the seventh embodiment, the resolution can be enhanced and the decrease in the amount of light can be restricted, compared with the fourth embodiment. In other words, according to the seventh embodiment, more excellent resolution and more excellent amount of light can be obtained, compared with the forth embodiment.

As described above, in the specific example of the seventh embodiment, the distance $P_{S4}$ between the center of the opening 185 and the center of the lens array 180 in the width direction is 0.500 mm, and the row-center-to-array-center distance $P_A$ is 0.400 mm. Since the distance between the adjacent openings 185 can be relatively increased, the light-blocking portion 184 can be easily manufactured.

Furthermore, the resolution can be enhanced, and the amount of light can be increased.

The lens array of the seventh embodiment is applicable to the reading apparatus (FIG. 19) as described in the third embodiment.

ALTERNATIVE EXAMPLE

Figure 41:
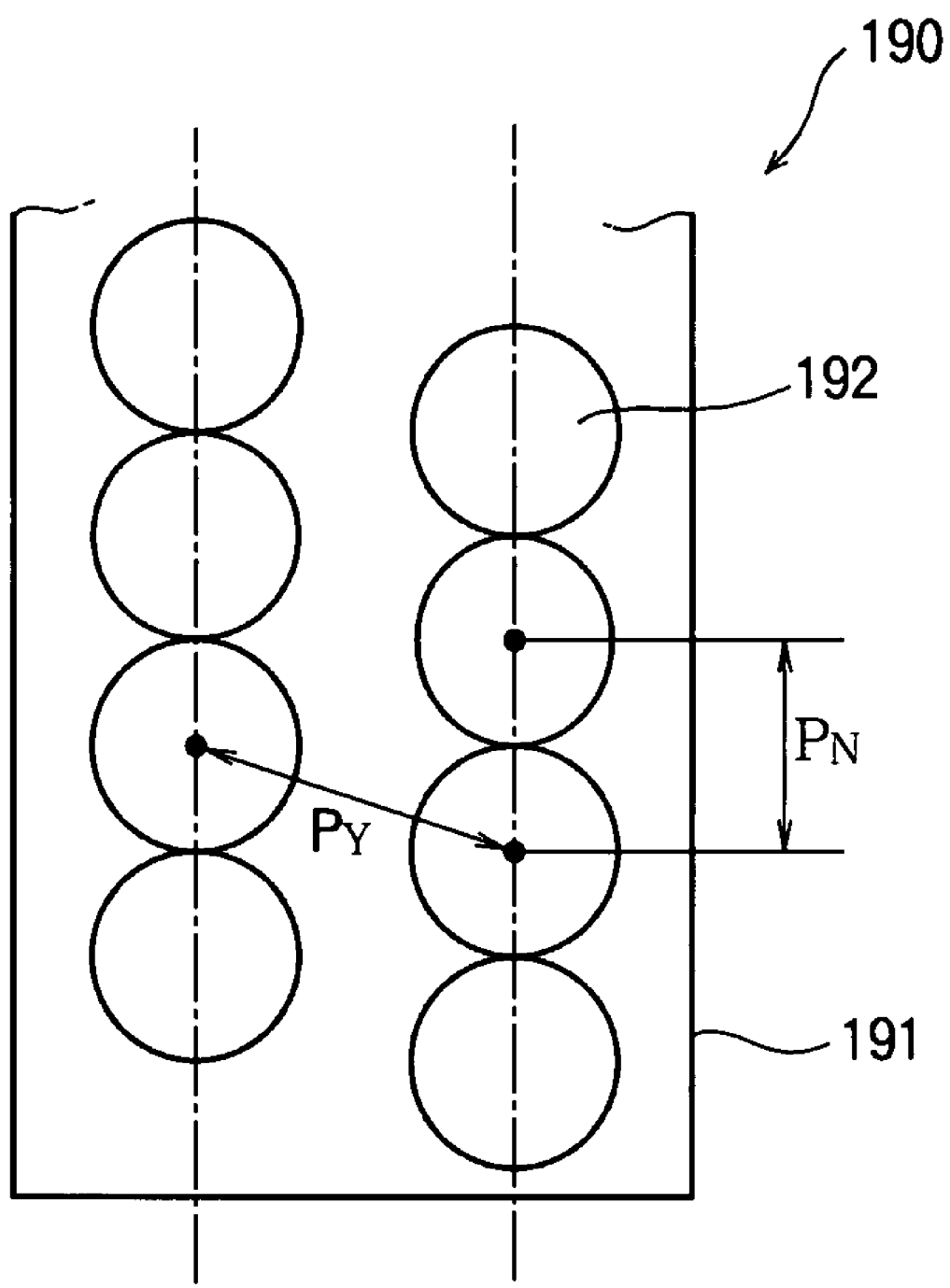
FIG. 41 shows alternative example of the arrangement of the micro lenses applicable to the previous embodiments.

FIG. 41 is an alternative example of the arrangement of the micro lens 150 (FIG. 23) of the fourth embodiment.

In the alternative example shown in FIG. 41, micro lenses 192 of each lens plate 191 are arranged in two rows and in a staggered manner. In this alternative example, the arrangement interval $P_N$ of the micro lenses 192 in the arranging direction of the micro lenses 192 (the second direction) is smaller than the arrangement interval $P_Y$ of the micro lenses 192 in the direction in which the closest micro lenses 192 face each other across the rows (the first direction). As the arrangement interval $P_N$ is small, the resolution can be enhanced, and the amount of light can be increased.

The alternative example shown in FIG. 41 can also be applied to the lens array 160 (FIG. 30), the lens array 170 (FIG. 34) and the lens array 180 (FIG. 38).

In the above described embodiments, the lens array has the micro lenses. However, the present invention is applicable to the lens array having rode lenses.

Further, in the above described embodiments, the image forming apparatus is not limited to the printer, but can be a copier, a facsimile, a compound apparatus or the like.

In the above described embodiments, the lenses of the lens array have the same diameter. However, it is also possible that the lenses of the lens array have different diameters.

While the preferred embodiments of the present invention have been illustrated in detail, it should be apparent that modifications and improvements may be made to the invention without departing from the spirit and scope of the invention as described in the following claims.

What is claimed is:

1. A lens array comprising:
   a plurality of lens groups each of which includes lenses having noncircular shapes so disposed that optical axes thereof are aligned with each other, said lens groups being arranged in a direction perpendicular to said optical axes, and
   a light-blocking portion that shields each of said lens groups from light having passed through any lens of other lens groups, said light-blocking portion having a plurality of opening provided corresponding to said lens groups so as to cause light to pass through respective lens groups, said opening having center axes aligned with said optical axes,
   wherein a largest diameter D of said lens and a center-to-center distance P of adjacent lens groups satisfy the relationship:

$P<D$, wherein each of said openings has a width $W_X$ in a direction substantially perpendicular to an arrangement direction of said lens groups, and has a width $W_Y$ in a direction substantially parallel to said arrangement direction, said widths $W_X$ and $W_Y$ satisfying the relationship:

$W_Y<W_X$, wherein said opening has a substantially cylindrical shape whose diameter is the same as said width $W_X$ and which is bounded by two planes parallel to said optical axis, said two planes being distanced from each other at a distance which is the same as said width $W_Y$.

2. The lens array according to claim 1, wherein said light-blocking portion is made of a material that blocks the light and has a plurality of openings;
   wherein an arrangement interval at which said openings are arranged is the same as said center-to-center distance P, and
   wherein each of said openings has a width $W_X$ in a direction perpendicular to a direction in which said openings are arranged and a width $W_Y$ in a direction parallel to said direction in which said openings are arranged, said widths $W_X$ and $W_Y$ satisfying the relationship:

$W_Y<W_X$.

3. An exposure device comprising:
   said lens array according to claim 1.

4. An image forming apparatus comprising:
   said exposure device according to claim 3.

5. A reading apparatus comprising:
   said lens array according to claim 1.

6. The lens array according to claim 1, wherein said lenses are composed of compound lenses.

7. The lens array according to claim 6, wherein said lens groups are arranged to form four lens plates,
   wherein two lens plates of said four lens plates are disposed on a side of said light-blocking portion, and the other two lens plates of said four lens plates are disposed on the other side of said light-blocking portion, wherein a largest diameter D1 of each of said lenses of said two lens plates and said center-to-center distance P satisfy the relationship:

P<D1, and

Wherein a largest Diameter D2 of each of said lenses of said the other two lens plates and said center-to-center distance P satisfy the relationship:

P<D2.

8. A lens array comprising:
a plurality of lenses,
said plurality of lenses comprising:
first and second lenses arranged in a first direction perpendicular to optical axes of said first and second lenses, a center-to-center distance of said first and second lenses being expressed as $P_Y$, and
third and fourth lenses arranged in a second direction perpendicular to optical axes of said third and fourth lenses, a center-to-center distance of said third and fourth lenses being expressed as $P_N$,
wherein said center-to-center distances $P_Y$ and $P_N$ satisfy the relationship:

$P_Y > P_N$, and wherein said first direction and said second direction are inclined with respect to each other, without being perpendicular to each other.

9. The lens array according to claim 8, wherein one of said first and second lenses is the same as one of said third and fourth lenses.

10. The lens array according to claim 8, wherein said first direction is a direction in which said plurality of lenses are arranged in rows, and said second direction is a direction in which two closest lenses face each other across said rows.

11. The lens array according to claim 8, wherein each of said plurality of lenses forms an erected image at the same magnification, and
wherein said plurality of lenses include lens groups each of which includes a pair of lenses arranged in two stages in the direction of the optical axes.

12. The lens array according to claim 11, wherein a light-blocking member is disposed between said stages, and said light-blocking member shields each of said lens groups from light having passed through any lens of other lens groups.

13. The lens array according to claim 8, wherein each of said plurality of lenses has a shape bounded by two planes respectively in the vicinities of borders with adjacent lenses.

14. An exposure device comprising:
said lens array according to claim 8.

15. An image forming apparatus comprising:
said exposure device according to claim 14.

16. A reading apparatus comprising:
said lens array according to claim 8.

17. The lens array according to claim 8, further comprising a light-blocking portion that shields each of said lenses from light having passed through other lens,
wherein said light-blocking portion is made of a material that blocks the light and has a plurality of openings,
wherein an arrangement interval at which said opening are arranged is the same as said center-to-center distance $P_Y$, and
wherein each of said openings has a width $W_X$ in a direction perpendicular to said first direction and a width $W_Y$ in a direction parallel to said first direction, said widths $W_X$ and $W_Y$ satisfying the relationship: $W_Y < W_X$.

18. A lens array comprising a plurality of lenses,
said plurality of lenses comprising:
first and second lenses disposed adjacent to each other,
wherein an interval $P_{N2}$ between optical axes of said first and second lenses and a largest distance $r_L$ between an optical axis and a periphery of each of said first and second lenses satisfy the relationship:

$P_{N2} < 2r_L$.

19. The lens array according to claim 18, wherein each of said plurality of lenses forms an erected image at the same magnification, and
wherein said plurality of lenses include lens groups each of which includes a pair of lenses arranged in two stages in the direction of optical axes.

20. The lens array according to claim 19, wherein a light-blocking member is disposed between said stages, and said light-blocking member shields each of said lens groups from light having passed through any lens of other lens groups.

21. The lens array according to claim 18, wherein each of said plurality of lenses has a shape bounded by two planes respectively in the vicinities of borders with adjacent lenses.

22. An exposure device comprising:
said lens array according to claim 18.

23. An image forming apparatus comprising:
said exposure device according to claim 22.

24. A reading apparatus comprising:
said lens array according to claim 18.

25. The lens array according to claim 18, wherein said plurality of lenses are arranged in rows, and said first and second lenses are disposed on different rows adjacent to each other;
wherein, when an arrangement interval of lenses of each row is expressed as $P_y$, the following relationship is satisfied:

$P_{N2} < P_Y$.

26. The lens array according to claim 18, wherein said plurality of lenses are arranged in N rows in a staggered manner such that M lenses are arranged in a first direction in each row and N rows are arranged in a second direction, satisfying the relationship M>N,
wherein an interval between optical axes of said lenses adjacent to each other in said first direction is expressed as $P_Y$,
wherein said first and second lenses are the closes lenses respectively belonging to rows adjacent to each other,
wherein said interval $P_{N2}$ between optical axes of said first and second lenses is smaller than said interval $P_Y$ between optical axes of said lenses adjacent to each other in said first direction, and
wherein said interval $P_{N2}$ is smaller than said largest distance $r_L$ between an optical axis and a periphery of each of said first and second lenses.

27. The lens array according to claim 26, wherein said plurality of lenses are arranged in two rows, and optical axes of said lenses are inclined toward a center in a widthwise direction of said lens array.

28. A lens array comprising:
a plurality of lenses arranged in at least two rows, and
a light-blocking portion provided between said rows for shielding each lens from light having passed through adjacent lens across said rows,
wherein said light-blocking portion is made of a material that blocks the light and has a plurality of openings,
wherein each of said openings has a width $W_X$ in a direction substantially perpendicular to an arranging direction of said lenses, and has a width $W_Y$ in a direction substantially parallel to said arranging direction, said widths $W_X$ and $W_Y$ being defined in a plane perpendicular to optical axes of said lenses, said widths $W_X$ and $W_Y$ satisfying the relationship: $W_Y < W_X$,
wherein said openings have center axes aligned with optical axes of said lenses, and
wherein each of said openings has a substantially cylindrical shape whose diameter is the same as said width $W_X$ and which is bounded by two planes parallel to said optical axes, said two planes being distanced from each other at a distance which is the same as said width $W_Y$.

29. The lens array according to claim 28, wherein said lenses are arranged at an arranging interval, and said openings of said light-blocking portions are arranged at an arranging interval which is substantially the same as said arranging interval of said lenses.

30. The lens array according to claim 28, wherein said openings of said light-blocking portion are so formed that centers thereof are aligned with optical axes of said lenses,
wherein each of said openings has cylindrical surfaces that defines a diameter which is substantially the same as said width $W_X$, and has two flat surfaces facing each other at an interval which is substantially the same as said width $W_Y$.

31. An exposing device comprising:
said lens array according to claim 28.

32. An image forming apparatus comprising:
said exposing device according to claim 31.

33. A reading apparatus comprising:
said lens array according to claim 28.

* * * * *